US007949364B2

(12) United States Patent
Kasslin et al.

(10) Patent No.: US 7,949,364 B2
(45) Date of Patent: May 24, 2011

(54) SYSTEM FOR MANAGING RADIO MODEMS

(75) Inventors: Mika Kasslin, Espoo (FI); Mauri Honkanen, Tampere (FI); Jukka Reunamäki, Tampere (FI); Päivi M. Ruuska, Tampere (FI); Hannu E. Laine, Espoo (FI); Miika O. Laaksonen, Espoo (FI)

(73) Assignee: Nokia Corporation, Espoo (FI)

( * ) Notice: Subject to any disclaimer, the term of this patent is extended or adjusted under 35 U.S.C. 154(b) by 312 days.

(21) Appl. No.: 11/538,310

(22) Filed: Oct. 3, 2006

(65) Prior Publication Data

US 2008/0081663 A1 Apr. 3, 2008

(51) Int. Cl.
- *H04M 1/00* (2006.01)
- *H04B 1/38* (2006.01)
- *H04W 72/00* (2009.01)
- *H04W 4/00* (2009.01)

(52) U.S. Cl. ............... 455/552.1; 455/557; 455/450; 455/507; 370/310; 370/328; 370/338

(58) Field of Classification Search ............... 455/552.1, 455/557, 450, 507; 370/310, 328, 338
See application file for complete search history.

(56) References Cited

U.S. PATENT DOCUMENTS

| 4,852,122 A | 7/1989 | Nelson et al. |
| 5,367,563 A | 11/1994 | Sainton |
| 5,406,643 A | 4/1995 | Burke et al. |
| 5,448,701 A | 9/1995 | Metz, Jr. et al. |
| 5,459,458 A | 10/1995 | Richardson et al. |
| 5,461,627 A | 10/1995 | Rypinski |
| 5,479,475 A | 12/1995 | Grob et al. |
| 5,479,480 A | 12/1995 | Scott |
| 5,528,585 A | 6/1996 | Cooley et al. |
| 5,574,979 A | 11/1996 | West |
| 5,602,902 A | 2/1997 | Satterlund et al. |
| 5,619,531 A | 4/1997 | Taylor et al. |
| 5,673,268 A | 9/1997 | Sharma et al. |
| 5,754,588 A | 5/1998 | Tanaka |

(Continued)

FOREIGN PATENT DOCUMENTS

EP 1583295 10/2005

(Continued)

OTHER PUBLICATIONS

U.S. Appl. No. 11/431,706, filed May 11, 2006, Kasslin et al.

(Continued)

*Primary Examiner* — Nghi H Ly
*Assistant Examiner* — Timothy Pham
(74) *Attorney, Agent, or Firm* — Locke Lord Bissell & Liddell

(57) ABSTRACT

A system for managing the operation of a plurality of radio modems contained within the same WCD. One or more of the plurality of radio modems may be a dual-mode radio modem enabled to communicate using at least two separate radio protocols concurrently. The operation of the one or more dual-mode modems may be managed by resources encompassed in a radio modem interface coupled to, or integrated within, the dual-mode radio modem. These management resources may receive information from the operating system level of the WCD and from the at least two radio modem stacks utilizing the resources of the dual mode radio modem in order to coordinate the operation of the at least two radio protocols concurrently active in the modem.

20 Claims, 24 Drawing Sheets

U.S. PATENT DOCUMENTS

| | | | |
|---|---|---|---|
| 5,787,363 | A | 7/1998 | Scott et al. |
| 5,854,985 | A | 12/1998 | Sainton et al. |
| 5,875,186 | A | 2/1999 | Belanger et al. |
| 5,940,438 | A | 8/1999 | Poon et al. |
| 6,052,600 | A | 4/2000 | Fette et al. |
| 6,067,408 | A | 5/2000 | Runaldue et al. |
| 6,097,733 | A | 8/2000 | Basu et al. |
| 6,336,201 | B1 | 1/2002 | Geile et al. |
| 6,353,406 | B1 | 3/2002 | Lanzl et al. |
| 6,697,415 | B1 | 2/2004 | Mahany |
| 6,915,142 | B1 | 7/2005 | Wietfeldt |
| 6,957,068 | B2 | 10/2005 | Hutchinson et al. |
| 7,142,519 | B2 | 11/2006 | Saadeh et al. |
| 7,319,715 | B1 | 1/2008 | Souissi et al. |
| 7,409,195 | B2 | 8/2008 | Lin et al. |
| 7,412,224 | B2 | 8/2008 | Kotola et al. |
| 2002/0115421 | A1 | 8/2002 | Shahar et al. |
| 2002/0136233 | A1 | 9/2002 | Chen et al. |
| 2003/0060206 | A1 | 3/2003 | Sointula et al. |
| 2003/0078006 | A1* | 4/2003 | Mahany ............... 455/63 |
| 2004/0001429 | A1 | 1/2004 | Ma et al. |
| 2004/0027990 | A1 | 2/2004 | Lee et al. |
| 2004/0047324 | A1 | 3/2004 | Diener et al. |
| 2004/0048572 | A1 | 3/2004 | Godfrey |
| 2004/0190482 | A1 | 9/2004 | Baum et al. |
| 2005/0018706 | A1 | 1/2005 | Myojo |
| 2005/0048985 | A1 | 3/2005 | Haartsen |
| 2005/0170776 | A1 | 8/2005 | Siorpaes et al. |
| 2005/0223191 | A1* | 10/2005 | Ferris ............... 712/28 |
| 2006/0019700 | A1* | 1/2006 | Seo et al. ............ 455/553.1 |
| 2006/0068837 | A1 | 3/2006 | Malone |
| 2006/0092910 | A1 | 5/2006 | Dertz et al. |
| 2006/0135076 | A1 | 6/2006 | Honkanen et al. |
| 2006/0274704 | A1* | 12/2006 | Desai et al. ............ 370/338 |
| 2006/0292986 | A1 | 12/2006 | Bitran et al. |
| 2007/0070960 | A1* | 3/2007 | Barak et al. ............ 370/338 |
| 2007/0153723 | A1* | 7/2007 | Souissi et al. ............ 370/328 |
| 2007/0238482 | A1 | 10/2007 | Rayzman et al. |
| 2007/0263710 | A1 | 11/2007 | Kasslin et al. |
| 2007/0275746 | A1 | 11/2007 | Bitran |
| 2007/0281743 | A1 | 12/2007 | Palin et al. |
| 2008/0037485 | A1 | 2/2008 | Osinga et al. |
| 2008/0240048 | A1 | 10/2008 | Okker et al. |
| 2008/0279137 | A1 | 11/2008 | Pernu et al. |

FOREIGN PATENT DOCUMENTS

| | | |
|---|---|---|
| EP | 1703675 | 9/2006 |
| GB | 2399475 A | 9/2004 |
| GB | 2412817 A | 10/2005 |
| WO | 2001/035578 | 5/2001 |
| WO | 2004/023747 | 3/2004 |
| WO | 2004091241 A1 | 10/2004 |

OTHER PUBLICATIONS

U.S. Appl. No. 11/445,322, filed Jun. 2, 2006, Palin et al.
U.S. Appl. No. 11/753,867, filed May 25, 2007, Pernu et al.

* cited by examiner

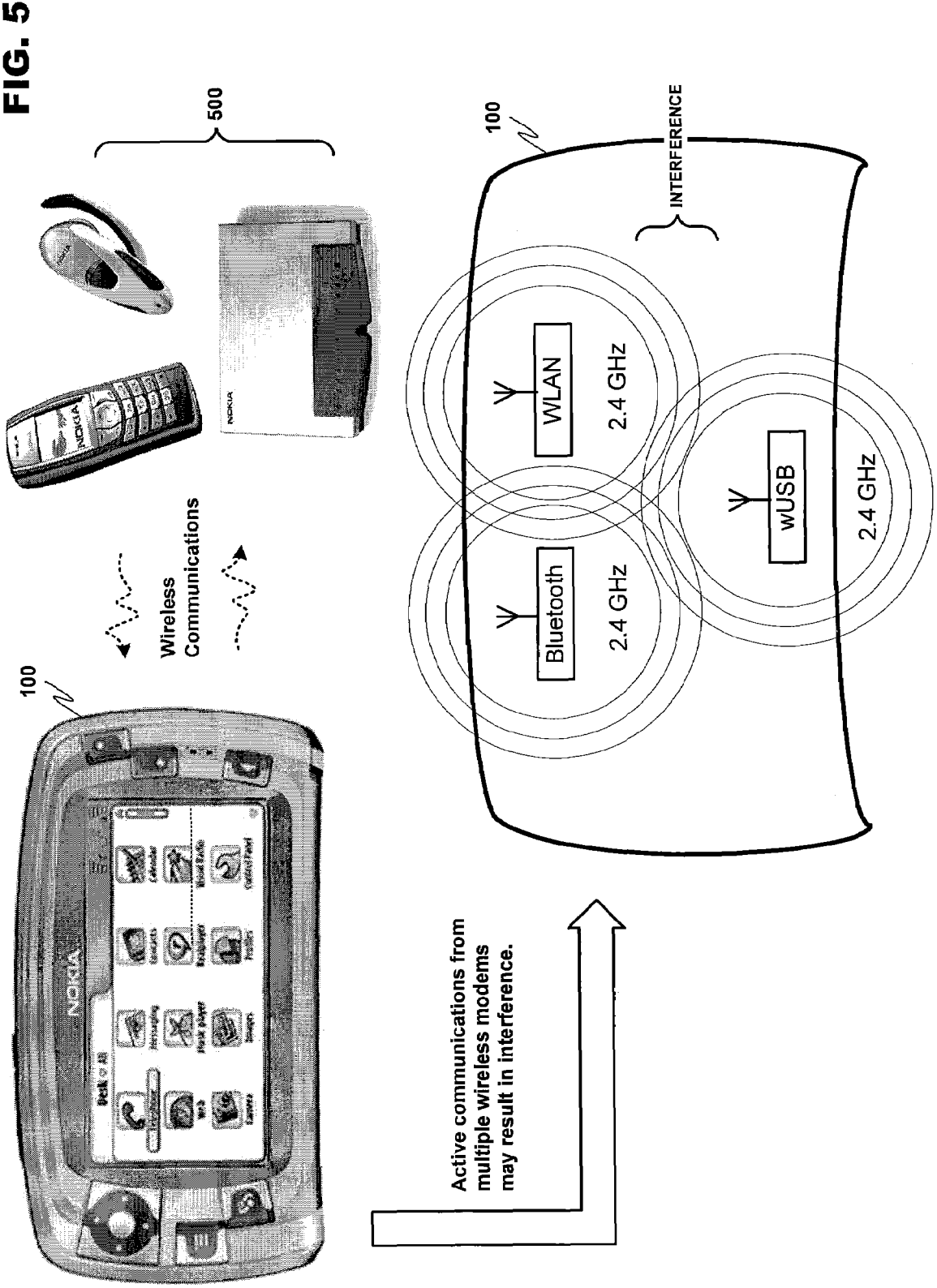

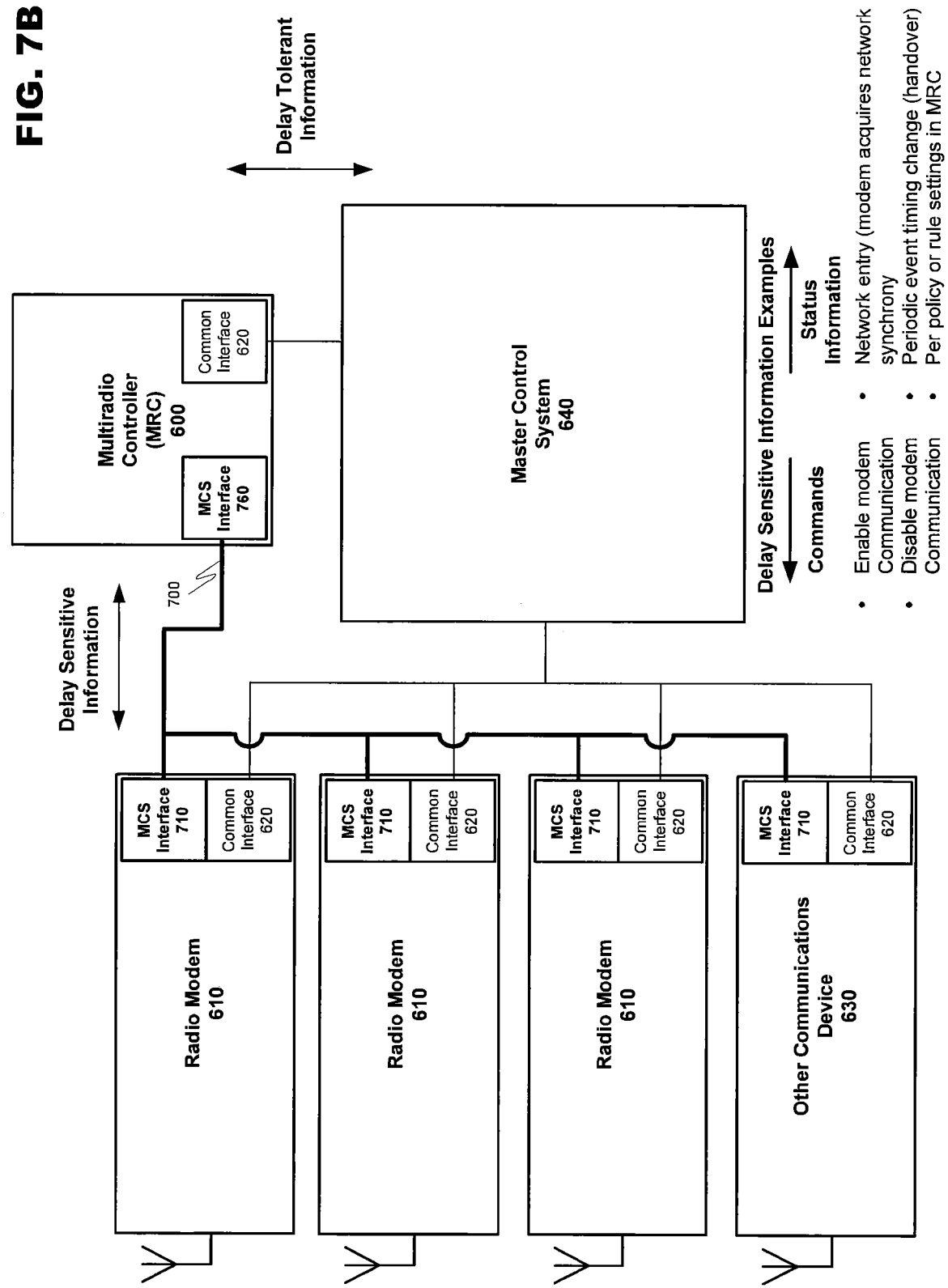

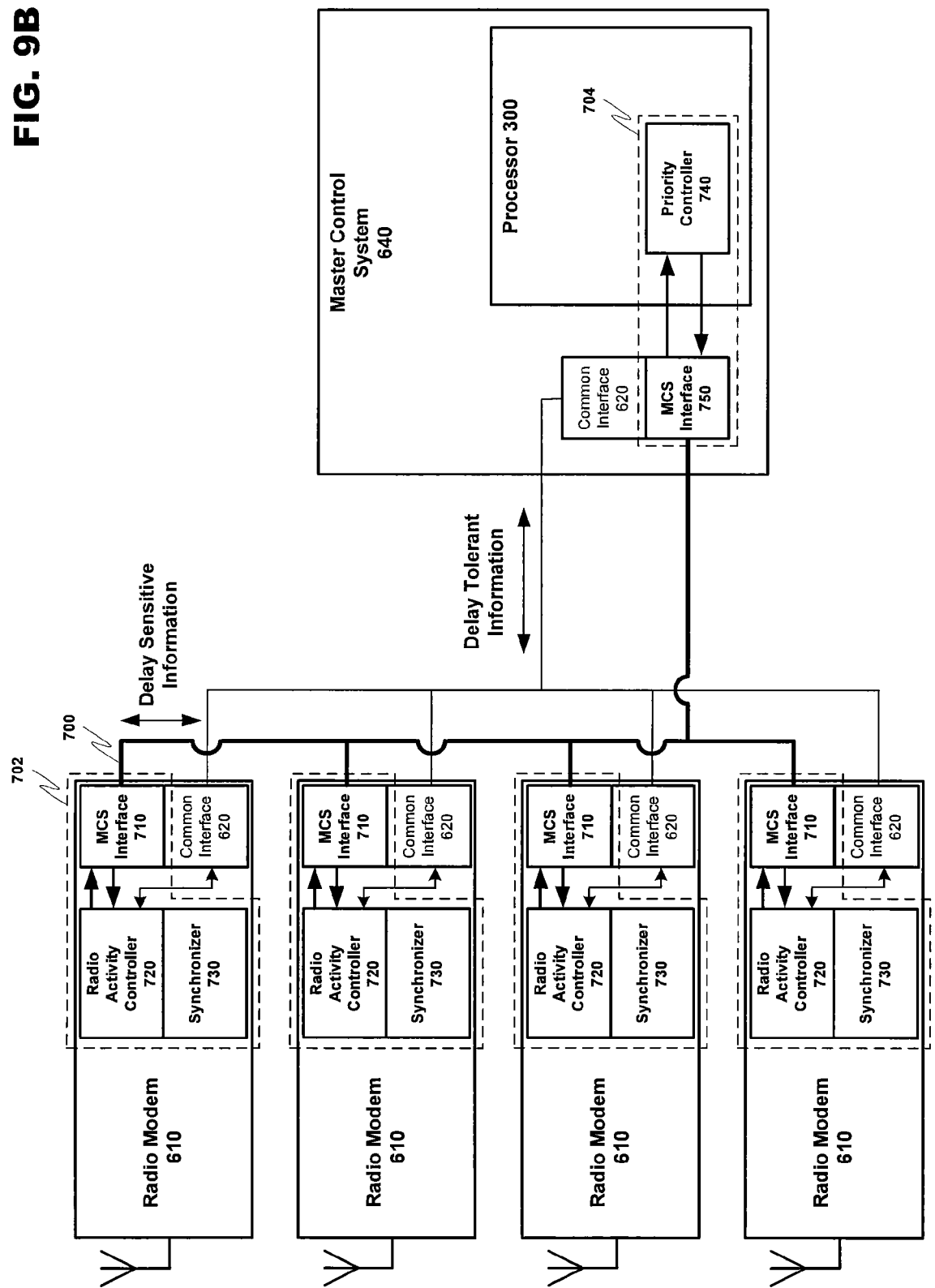

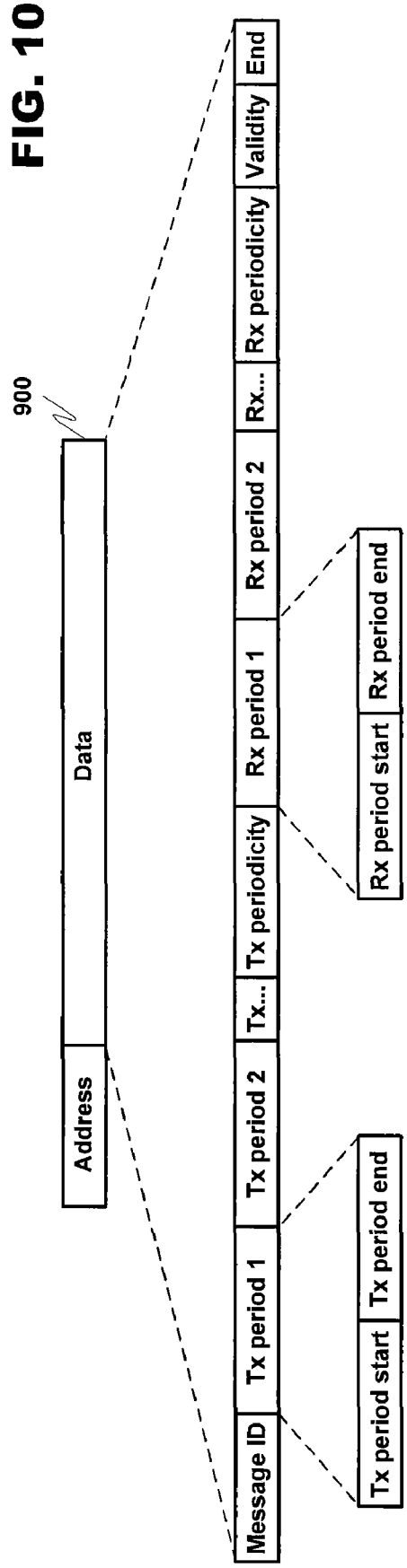

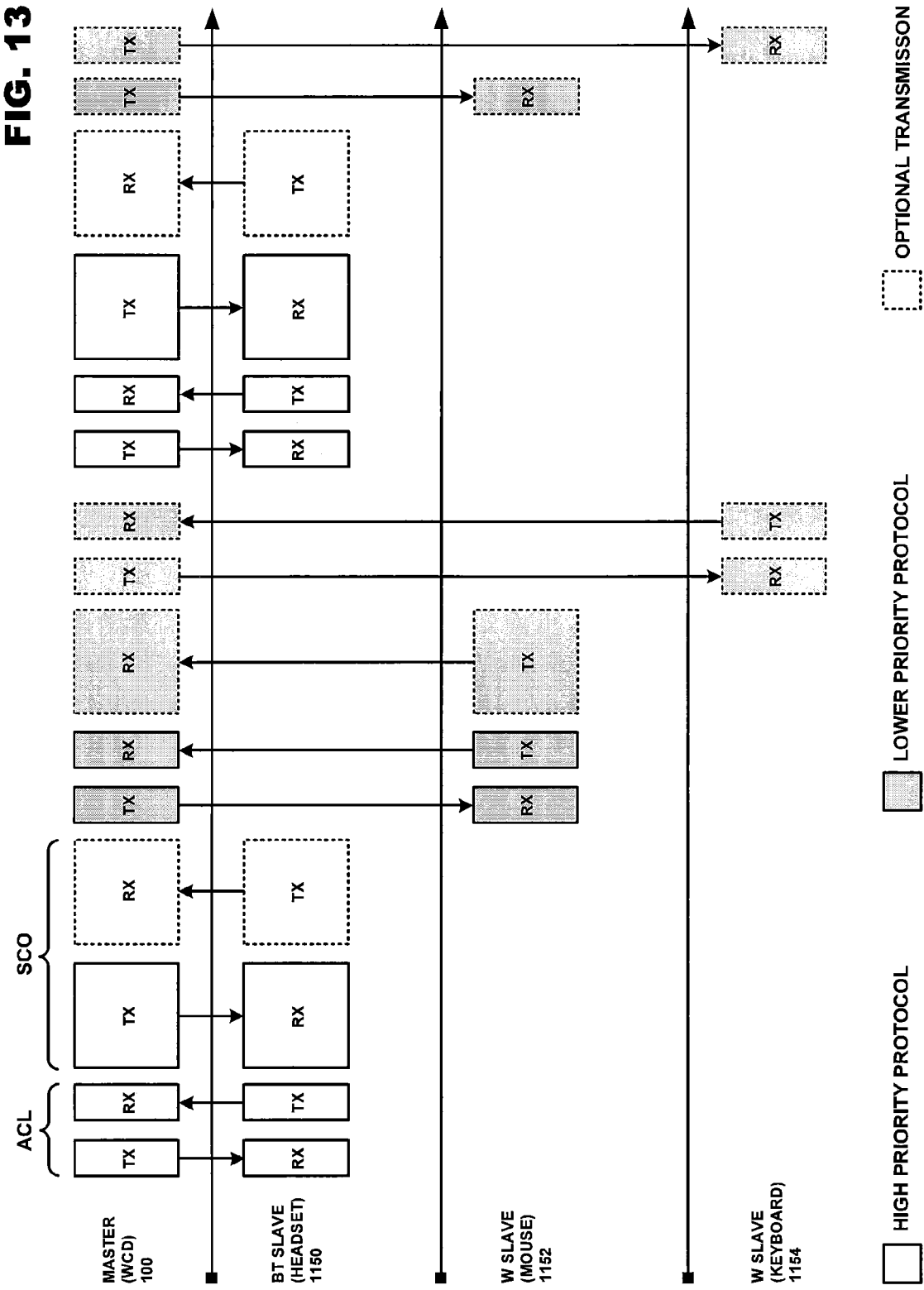

SYSTEM FOR MANAGING RADIO MODEMS

BACKGROUND OF INVENTION

1. Field of Invention

The present invention relates to a system for managing one or more radio modems imbedded in a wireless communication device, and more specifically, to managing at least one dual-mode radio modem so it may communicate using at least two radio protocols concurrently.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modem digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or readers may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and machine readable communication resources also often include multiple wireless mediums or radio protocols for each category. A multitude of wireless media options may assist a WCD in quickly adjusting to its environment, for example, communicating both with a WLAN access point and a Bluetooth™ peripheral device, possibly (and probably) at the same time.

Given the large array communication features that may be compiled into a single device, it is foreseeable that a user will need to employ a WCD to its full potential when replacing other productivity related devices. For example, a user may use a multifunction WCD to replace traditional tools such as individual phones, facsimile machines, computers, storage media, etc. which tend to be more cumbersome to both integrate and transport. In at least one use scenario, a WCD may be communicating simultaneously over numerous different wireless mediums. A user may utilize multiple peripheral Bluetooth™ devices (e.g., a headset and a keyboard) while having a voice conversation over GSM and interacting with a WLAN access point in order to access the Internet. Problems may occur when these concurrent transactions cause interference with each other. Even if a communication medium does not have an identical operating frequency as another medium, a radio modem may cause extraneous interference to another medium. Further, it is possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

While a WCD may engage in wireless communication with a multitude of other devices concurrently, in some instances a resource constraint may arise where two or more of the peripheral devices are communicating using radio protocols that are implemented into a single radio modem in the WCD. Such a scenario may occur, for example, when both a Bluetooth™ device and a Wibree™ device are being used concurrently. Wibree™ is an open standard industry initiative extending local connectivity to small devices with technology that increases the growth potential in these market segments. Wibree™ technology may complement close range communication with Bluetooth™-like performance in the 0-10 m range with a data rate of 1 Mbps. Wibree™ is optimized for applications requiring extremely low power consumption, small size and low cost. Wibree™ may be implemented either as stand-alone chip or as Bluetooth™-Wibree™ dual-mode chip. More information can be found on the Wibree™ website: www.wibree.com. Due to the similarity of these two radio protocols, a WCD may only include one radio modem assigned to handle communication for both wireless mediums. One radio modem attempting to communicate with multiple devices using separate radio protocols, also known as a dual-mode radio modem, may experience communication errors due to the collision of messages from the peripheral devices. Wireless communication devices are usually only scheduled only within their own radio protocol, and therefore, may be unaware that other simultaneous transactions may be occurring in a dual-mode radio modem over another radio protocol. Technology is now emerging to enable a WCD to schedule communications amongst a plurality of modems integrated within the same device, however, this control strategy may not necessarily benefit a dual-mode radio modem where the conflicts are not known at the operating system level, but only by the modem itself.

What is therefore needed is a management strategy and system for a dual-mode modem that may receive both information from an operating system-level communication manager in a WCD and also from different radio protocol stacks utilizing the dual-mode modem in order to coordinate communications between the concurrently operating radio protocols. In addition, any coordination between the radio protocols should include synchronizing the periodic timing and/or scheduling of the protocols so as to avoid potential communication collisions.

SUMMARY OF INVENTION

The present invention includes at least a method, device, mode, controller and computer program for managing the operation of a plurality of radio modems contained within the same WCD. One or more of the plurality of radio modems may be a dual-mode radio modem enabled to communicate using at least two separate radio protocols concurrently. The operation of the one or more dual-mode modems may be managed by resources encompassed in a radio modem interface coupled to, or integrated within, the dual mode radio modem. The management resources may receive information from the operating system level of the WCD and from the at least two radio modem stacks utilizing the hardware and/or software resources of the radio modem in order to coordinate the operation of the at least two radio protocols.

In at least one embodiment of the present invention, hardware and/or software resources comprising the radio modem interface may include at least an admission control and a Dual-Mode (DuMo) manager. These resources may receive scheduling information from the operating system-level of the WCD, and status information from the one or more radio modem stacks that utilize the hardware and/or software resources of the dual-mode radio modem in order to synchronize the periodic scheduling of the radio protocols so that collisions may be avoided.

A further example of the scheduling strategy that may be employed in the present invention may include determining a priority of one radio protocol over the at least one other protocol using the dual-mode modem. The protocol with the highest priority may, in some instances, be allowed to operate according to the operating system determined schedule without alteration. The admission control and/or DuMo manager may continually monitor the higher priority radio protocol to determine if periods of scheduled time will actually go unused. This unused time may be reallocated to devices using the lower priority protocol. As a result, concurrent communications may be maintained in a highly efficient and high quality manner.

DESCRIPTION OF DRAWINGS

The invention will be further understood from the following detailed description of a preferred embodiment, taken in conjunction with appended drawings, in which:

FIG. 5 discloses an operational example wherein interference occurs when utilizing multiple radio modems simultaneously within the same wireless communication device.

FIG. 7B discloses a more detailed structural diagram of FIG. 7A including the multiradio control system and the radio modems.

FIG. 9B discloses a more detailed structural diagram of FIG. 9A including the distributed multiradio control system and the radio modems.

FIG. 10 discloses an exemplary information packet usable with at least one embodiment of the present invention.

FIG. 13 discloses an exemplary timeline for communications occurring between a wireless communication device and peripheral devices communicating over different radio protocols utilizing the a dual-mode modem in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
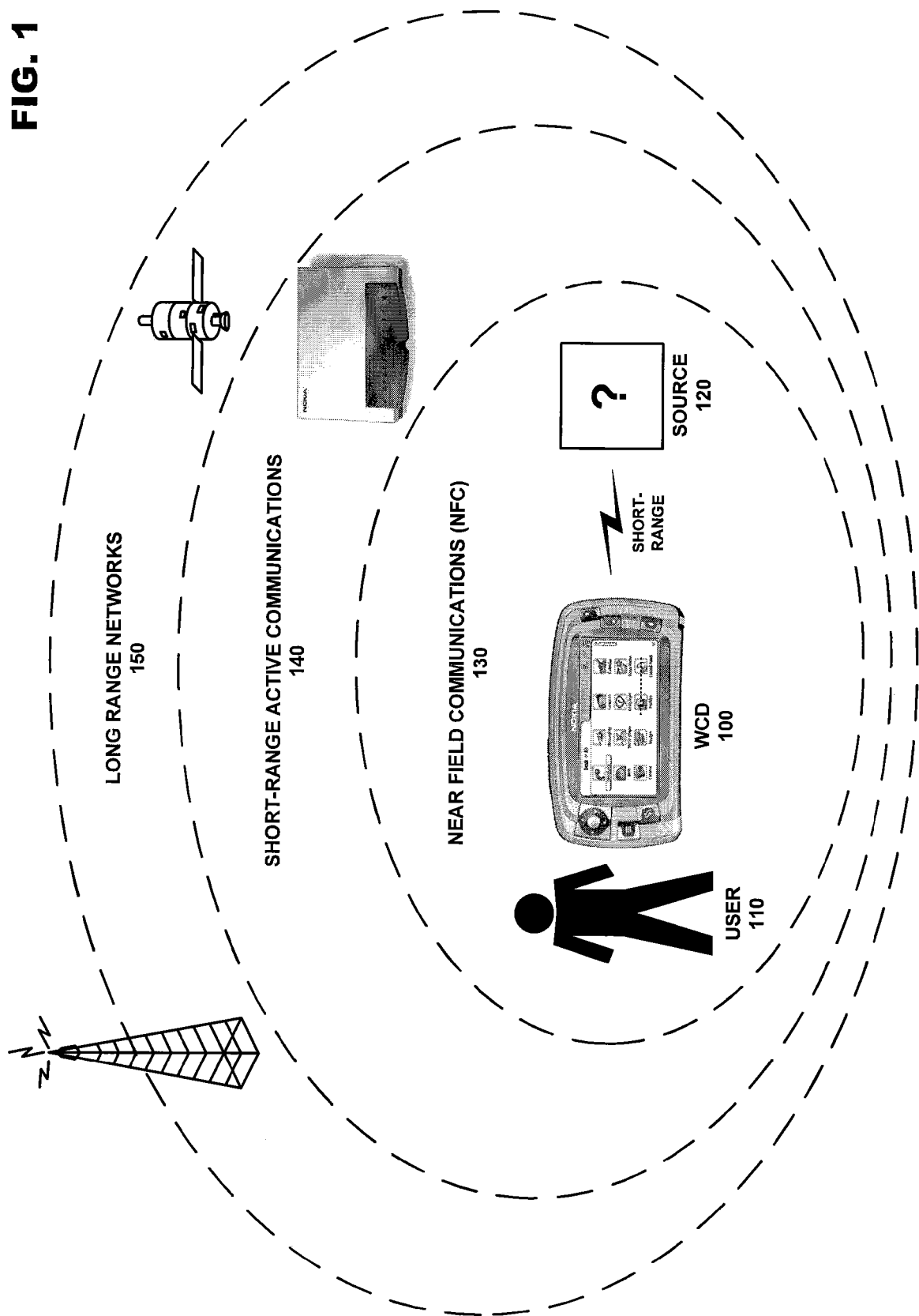
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Wibree™, a network may automatically be established to transmit information to WCD 100 possessed by user 110. Wibree™ may be used for battery-powered devices, such as wireless sensors, since its power consumption is low. A Wibree™ device may use the advertisement mode to more rapidly establish the initial connection to WCD 100. This data may include information of an informative, educational or entertaining nature. The amount of information to be conveyed is unlimited, except that it must all be transferred in the time when user 110 is within effective transmission range of the access point. This duration may be extremely limited if the user is, for example, strolling through a shopping mall or walking down a street. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
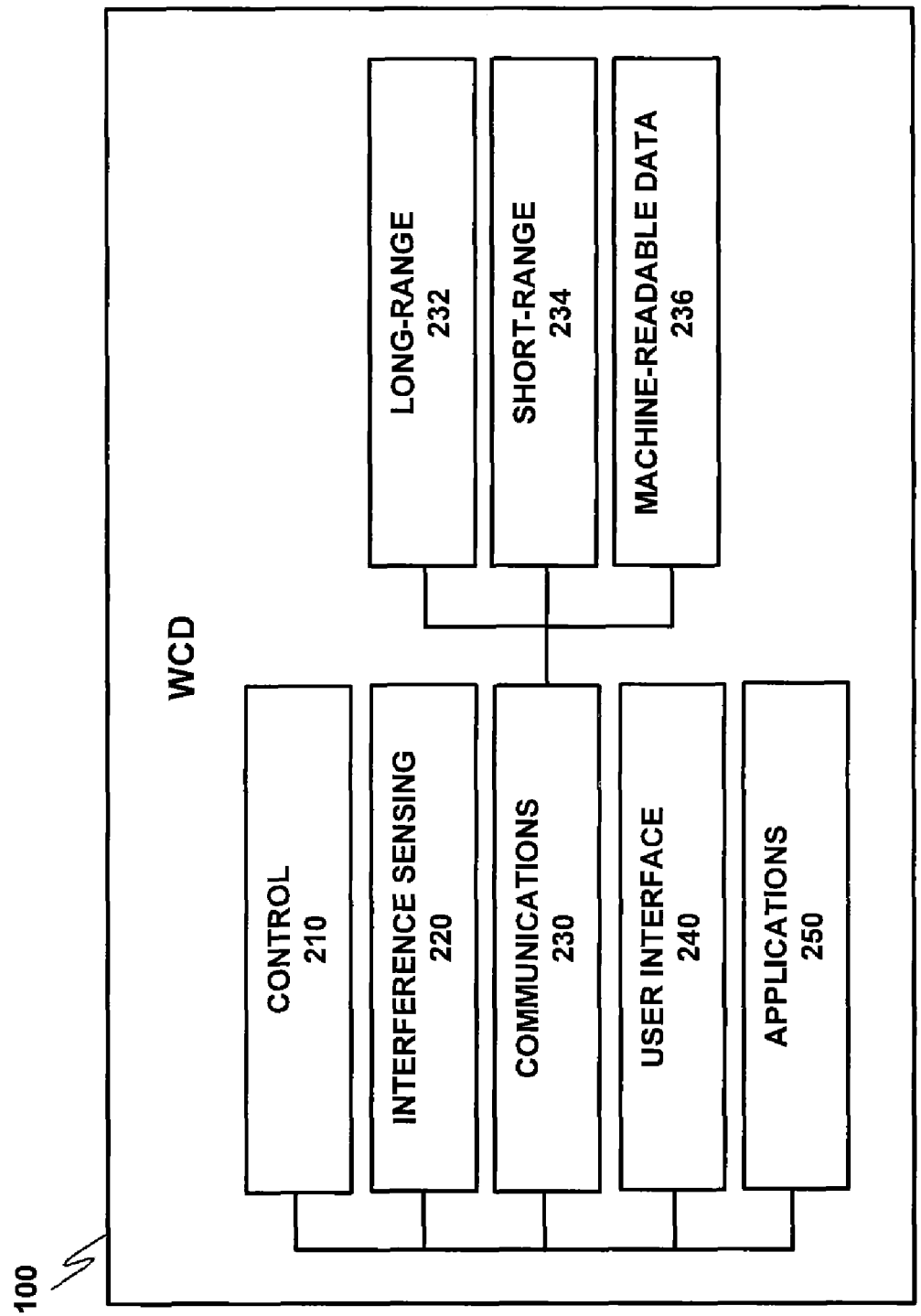
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device.

Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
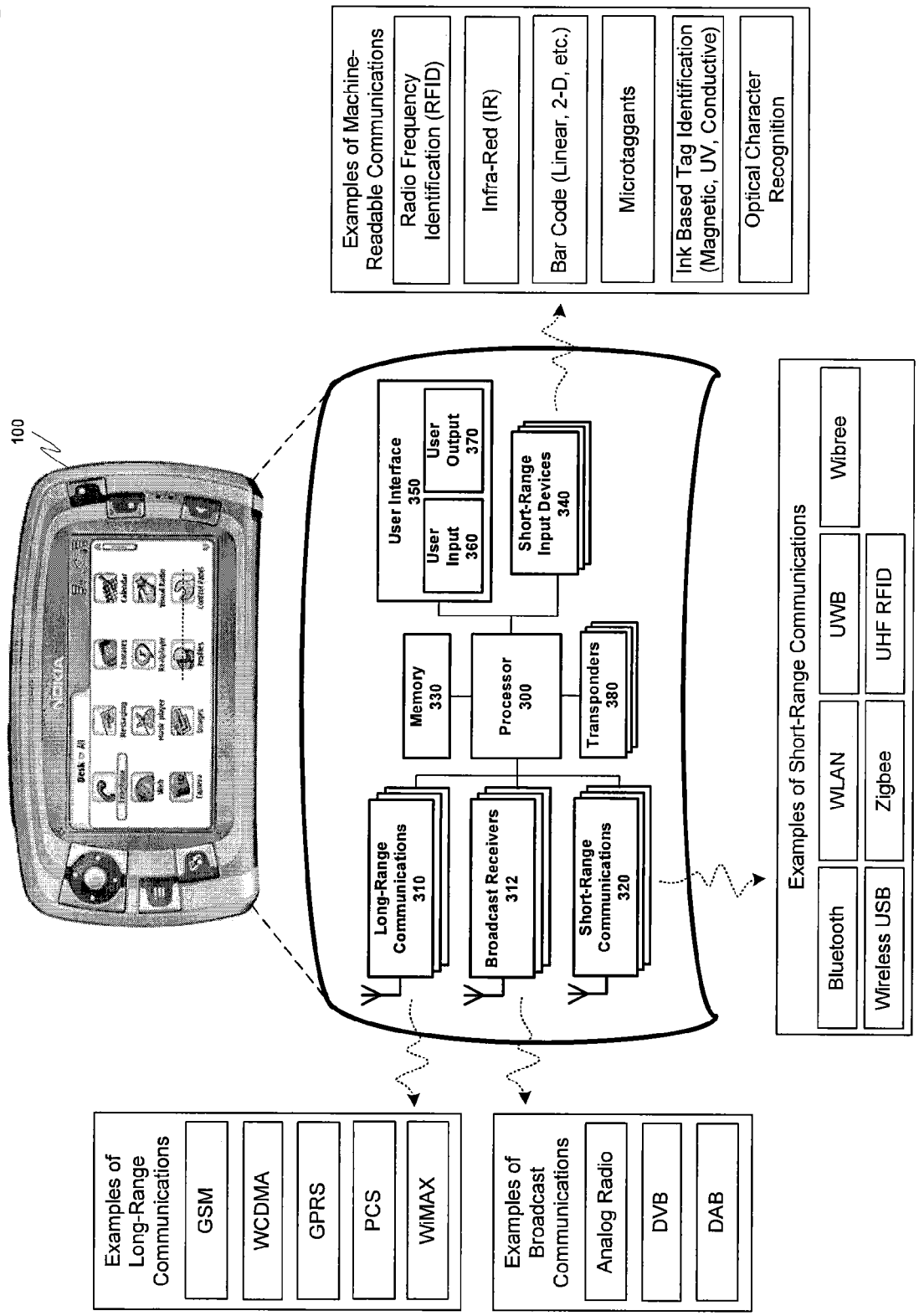
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to at least communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, Wibree™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by short-range input device 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID reader mounted in an entryway may continuously emit radio frequency waves. When a person with a device containing transponder 380 walks through the door, the transponder is energized and may respond with information identifying the device, the person, etc. In addition, a reader may be mounted (e.g., as discussed above with regard to examples of short-range input device 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

Figure 4:
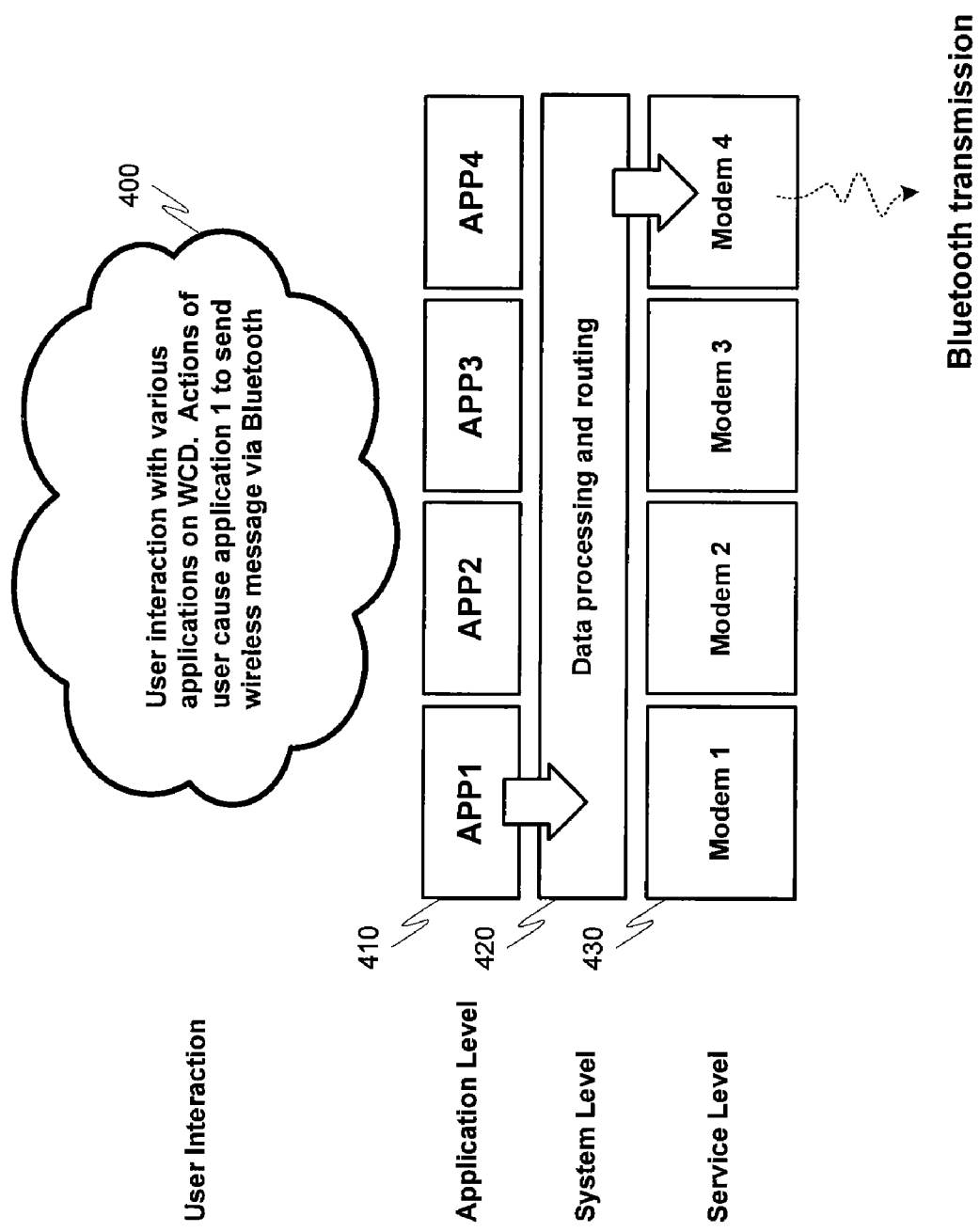
FIG. 4 discloses an exemplary operational description of a wireless communication device utilizing a wireless communication medium in accordance with at least one embodiment of the present invention.

III. Exemplary Operation of a Wireless Communication Device Including Potential Interference Problems Encountered FIG. 4 discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely. The present invention, in at least one embodiment, seeks to manage problematic situations where possibly conflicting communications may be occurring simultaneously so that interference is minimized or totally avoided, and as a result, speed and quality are maximized.

IV. A Wireless Communication Device Including a Multiradio Controller

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100. While this configuration may in some cases improve overall wireless communication efficiency for WCD 100, problems may occur when WCD 100 becomes busy (e.g., when the control system of WCD 100 is employed in multitasking many different simultaneous operations, both communication and non-communication related).

Figure 6A:
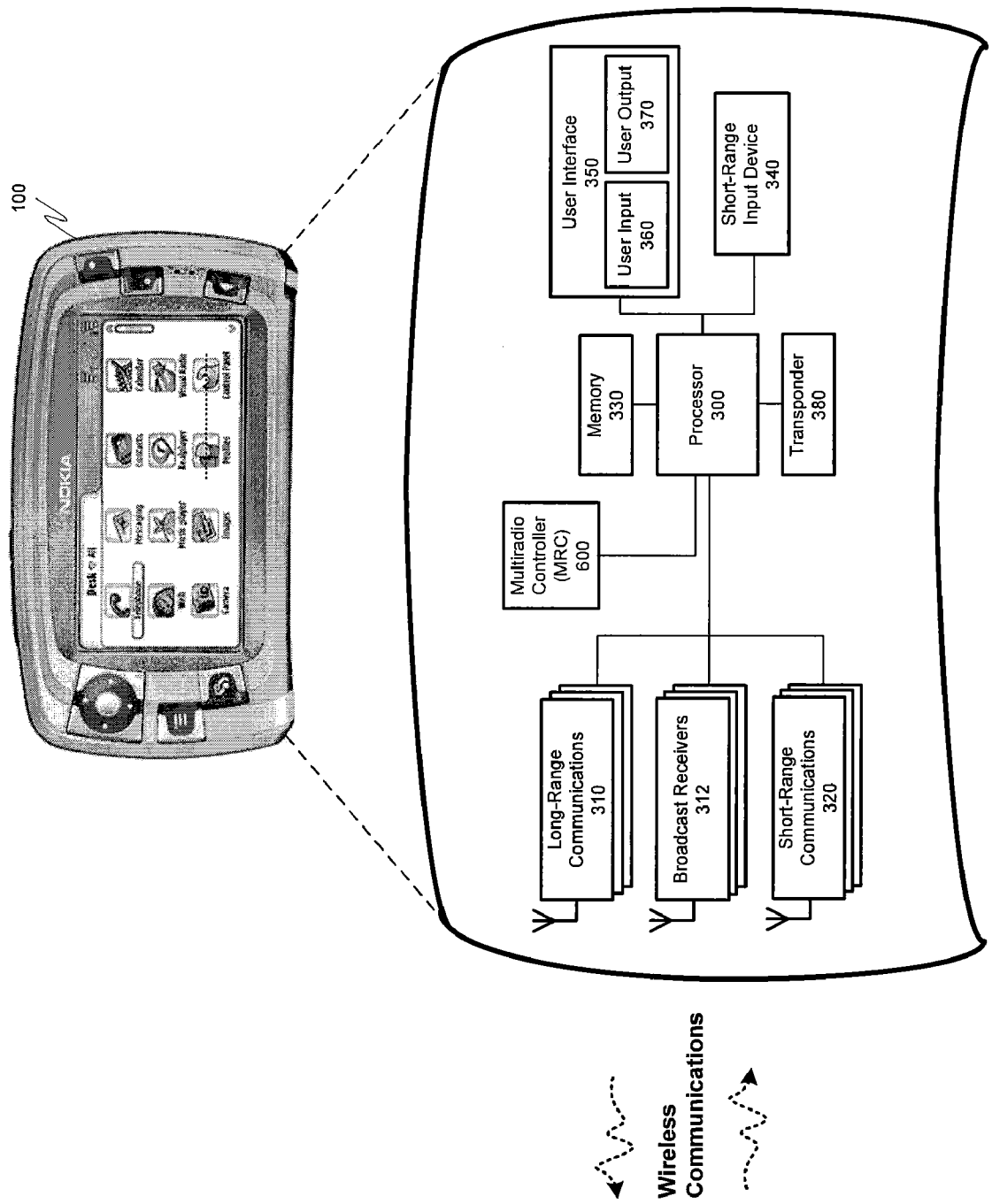
FIG. 6A discloses an exemplary structural description of a wireless communication device including a multiradio controller in accordance with at least one embodiment of the present invention.
Figure 6B:
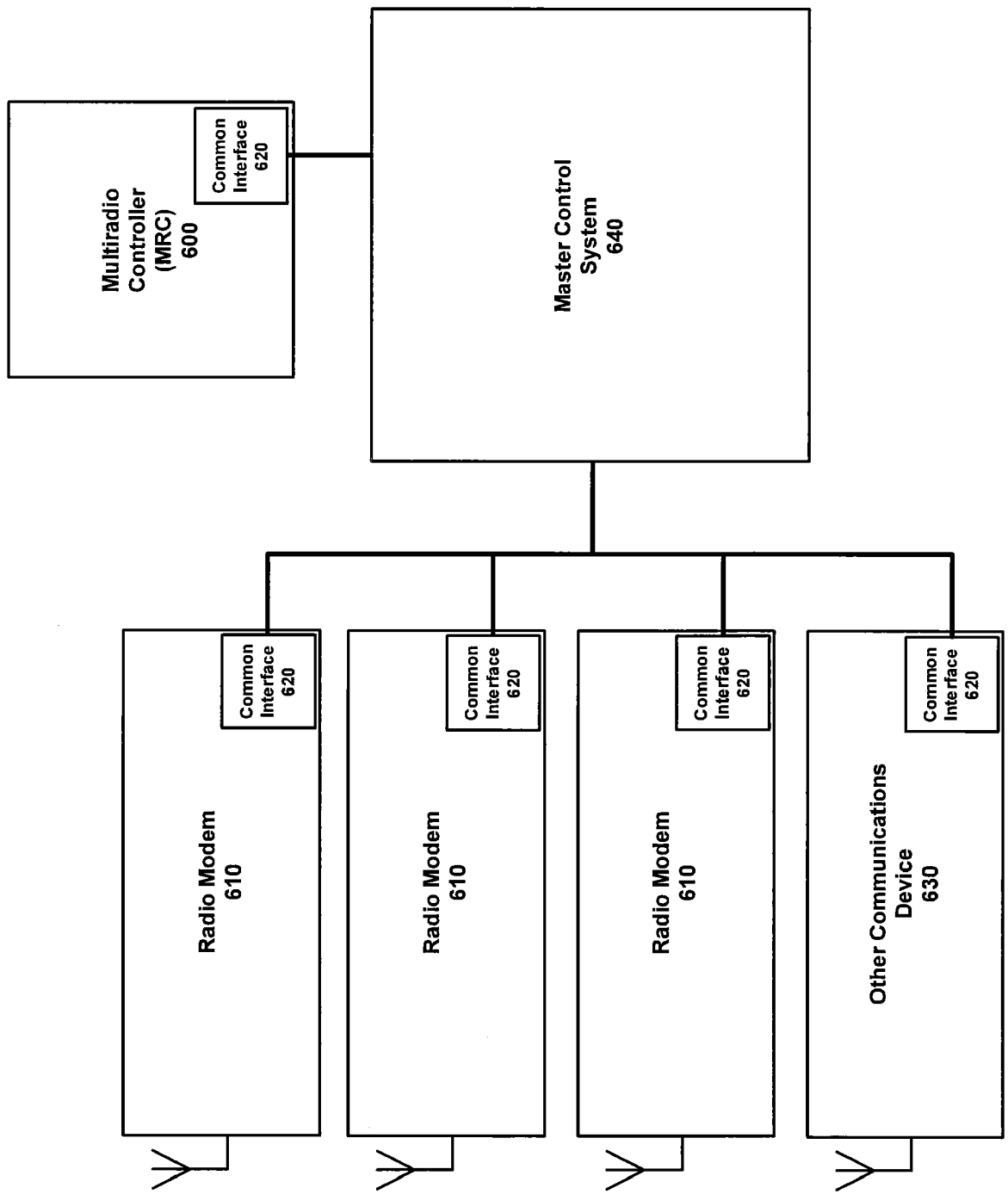
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Further, each radio modem 610 or similar communication device 630, for example an RFID reader for scanning machine-readable information, may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

Figure 6C:
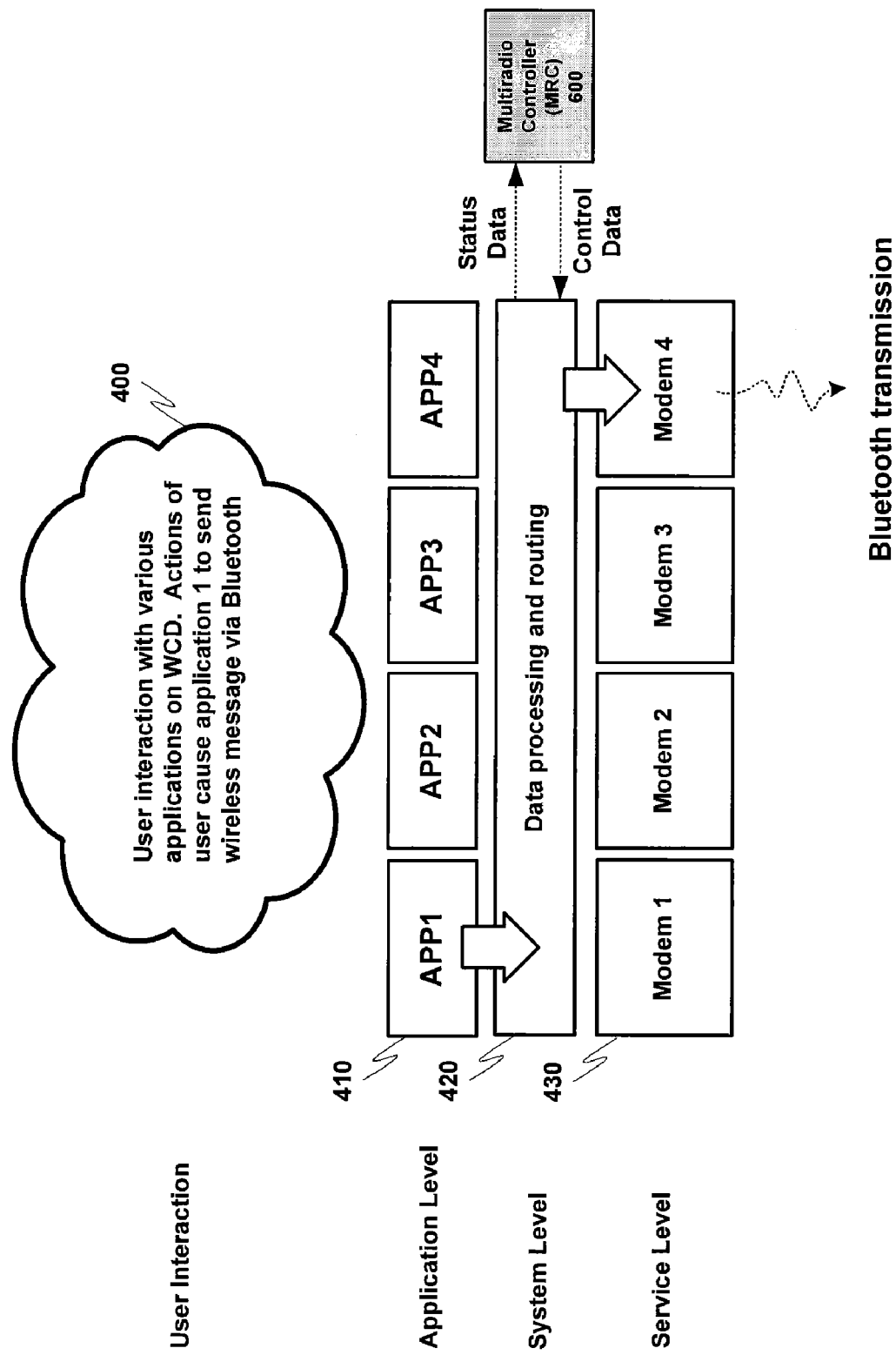
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System

Figure 7A:
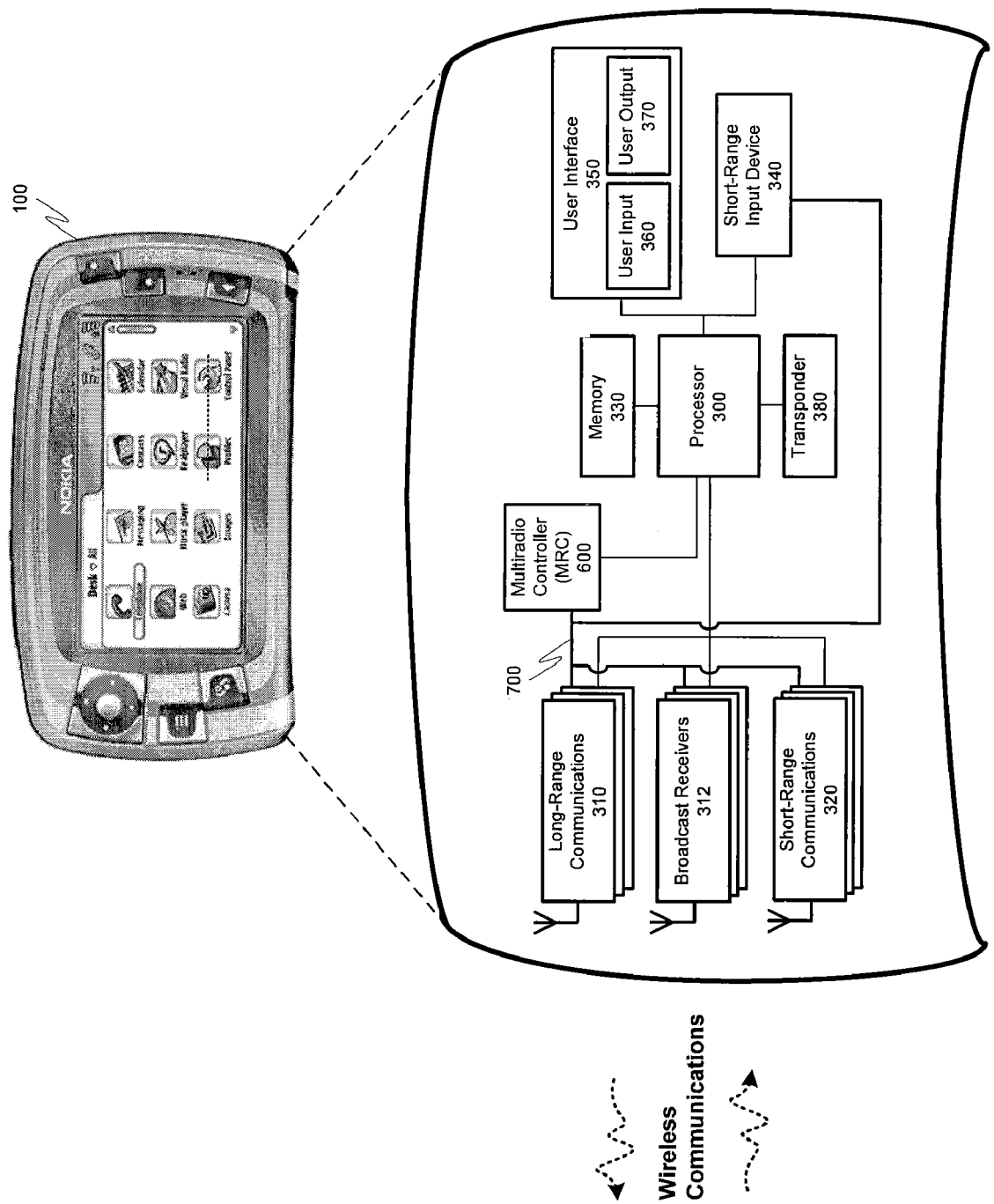
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

Figure 7C:
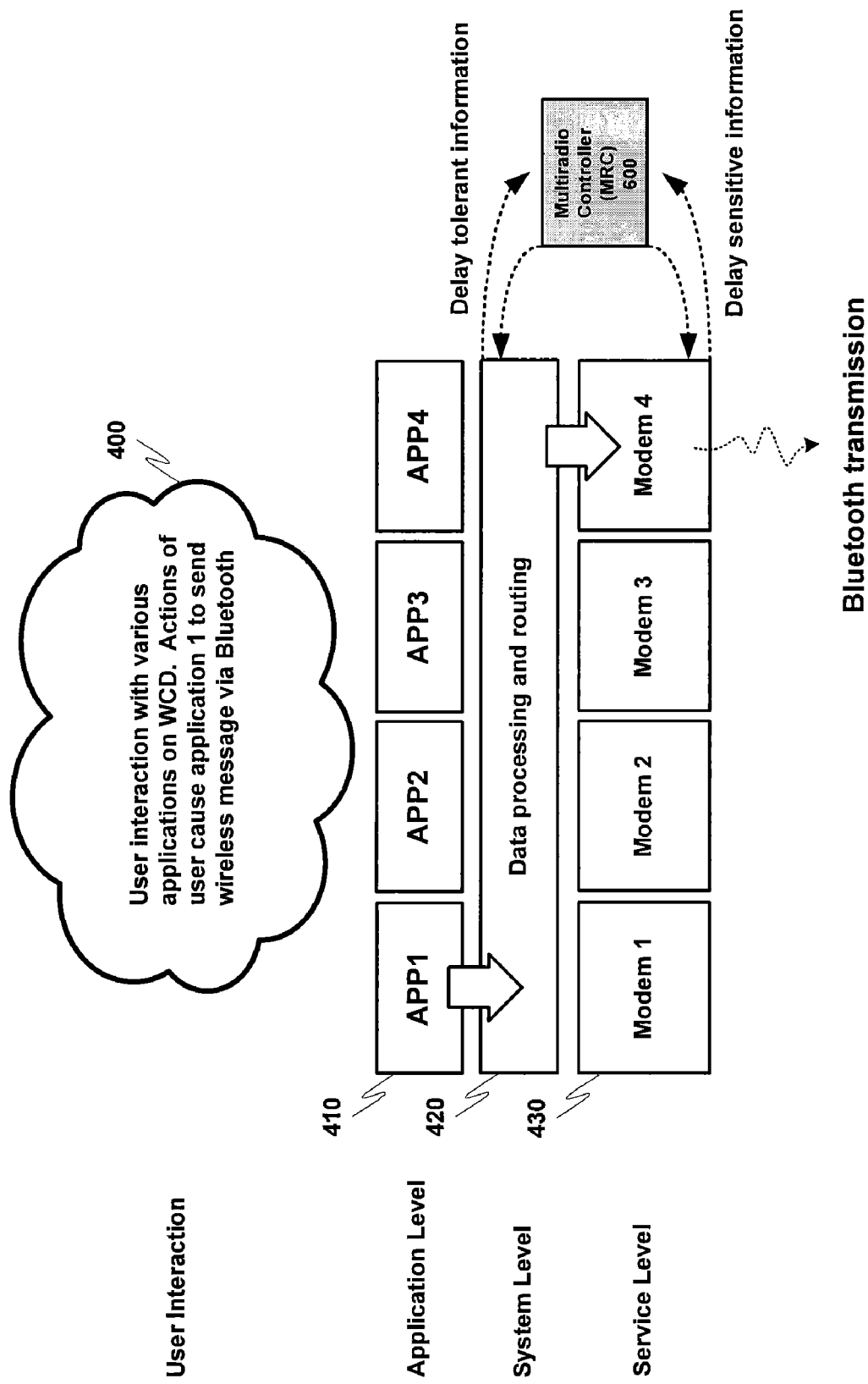
FIG. 7C discloses an exemplary operational description of a wireless communication device including a multiradio control system in accordance with at least one embodiment of the present invention.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

VI. A Wireless Communication Device Including a Distributed Multiradio Control System FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems 610, reducing the overall amount of control command traffic in WCD 100.

MCS 700, in this example, may be implemented utilizing a variety of bus structures, including the I²C interface commonly found in portable electronic devices, as well as emerging standards such as SLIMbus that are now under development. I²C is a multi-master bus, wherein multiple devices can be connected to the same bus and each one can act as a master through initiating a data transfer. An I²C bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's I²C and I²S interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 8A:
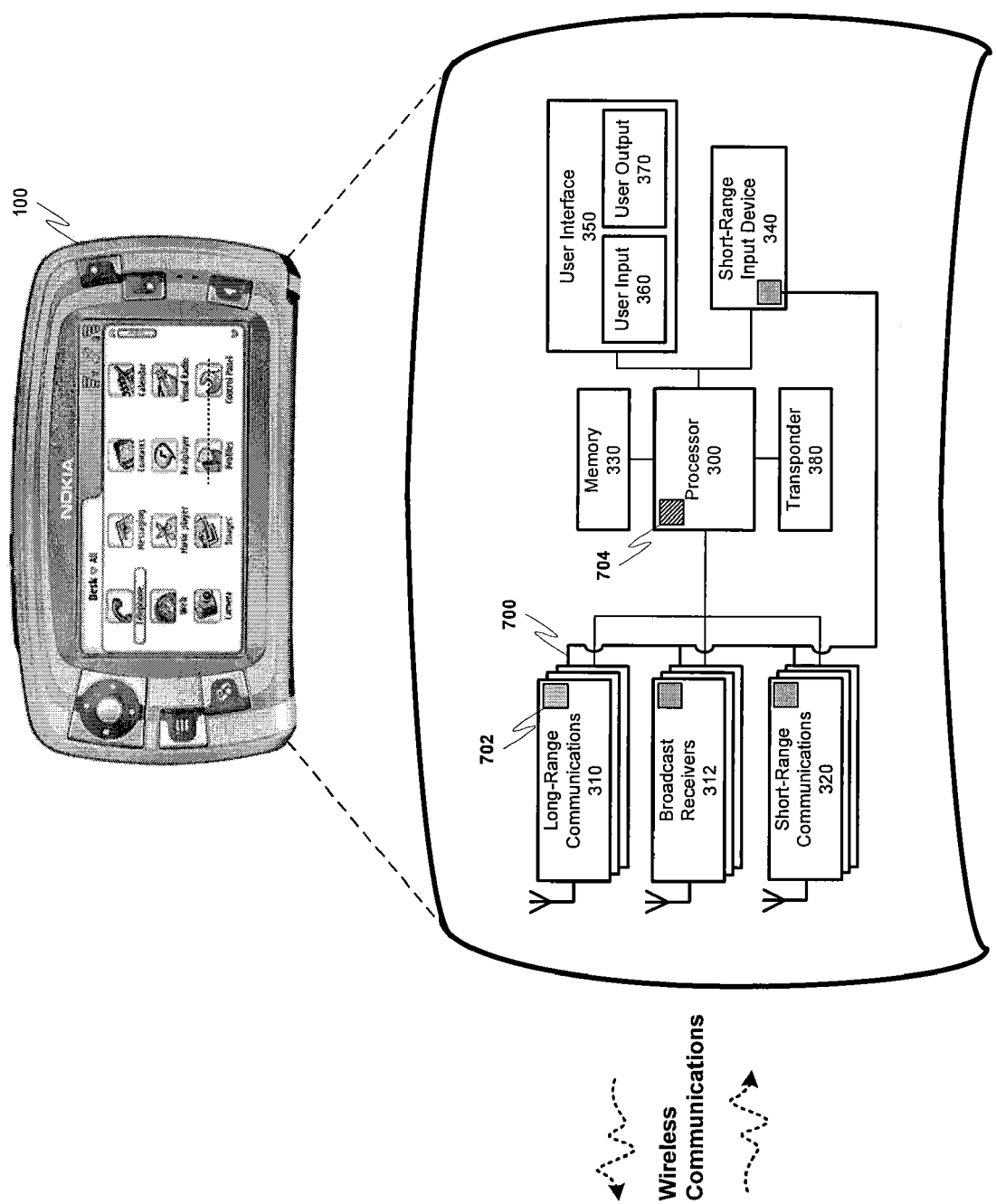
FIG. 8A discloses an exemplary structural description of a wireless communication device including a distributed multiradio control system in accordance with at least one embodiment of the present invention.
Figure 8B:
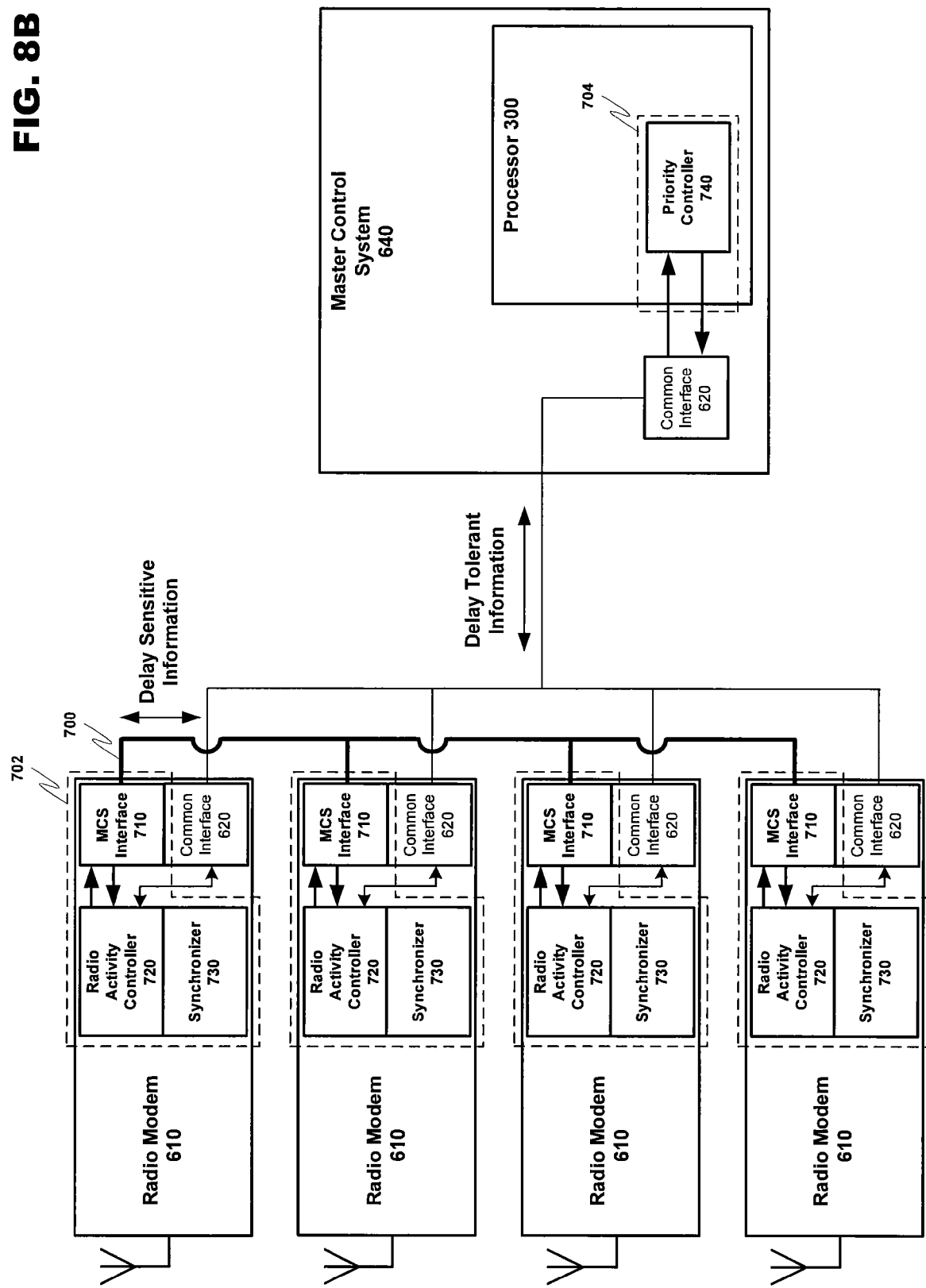
FIG. 8B discloses a more detailed structural diagram of FIG. 8A including the distributed multiradio control system and the radio modems.

The exemplary embodiment disclosed in FIG. 8A is described with more detail in FIG. 8B. MCS 700 forms a direct link between distributed control components 702 within WCD 100. Distributed control components 702 in radio modems 610 may, for example, consist of MCS interface 710, radio activity controller 720 and synchronizer 730.

Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 and their connections and/or services activate/deactivate, and therefore, does not frequently change during the course of an active communication connection in radio modems 610. As a result, this information may be conveyed to radio modems 610 using common interface system 620 in at least one embodiment of the present invention.

Figure 8C:
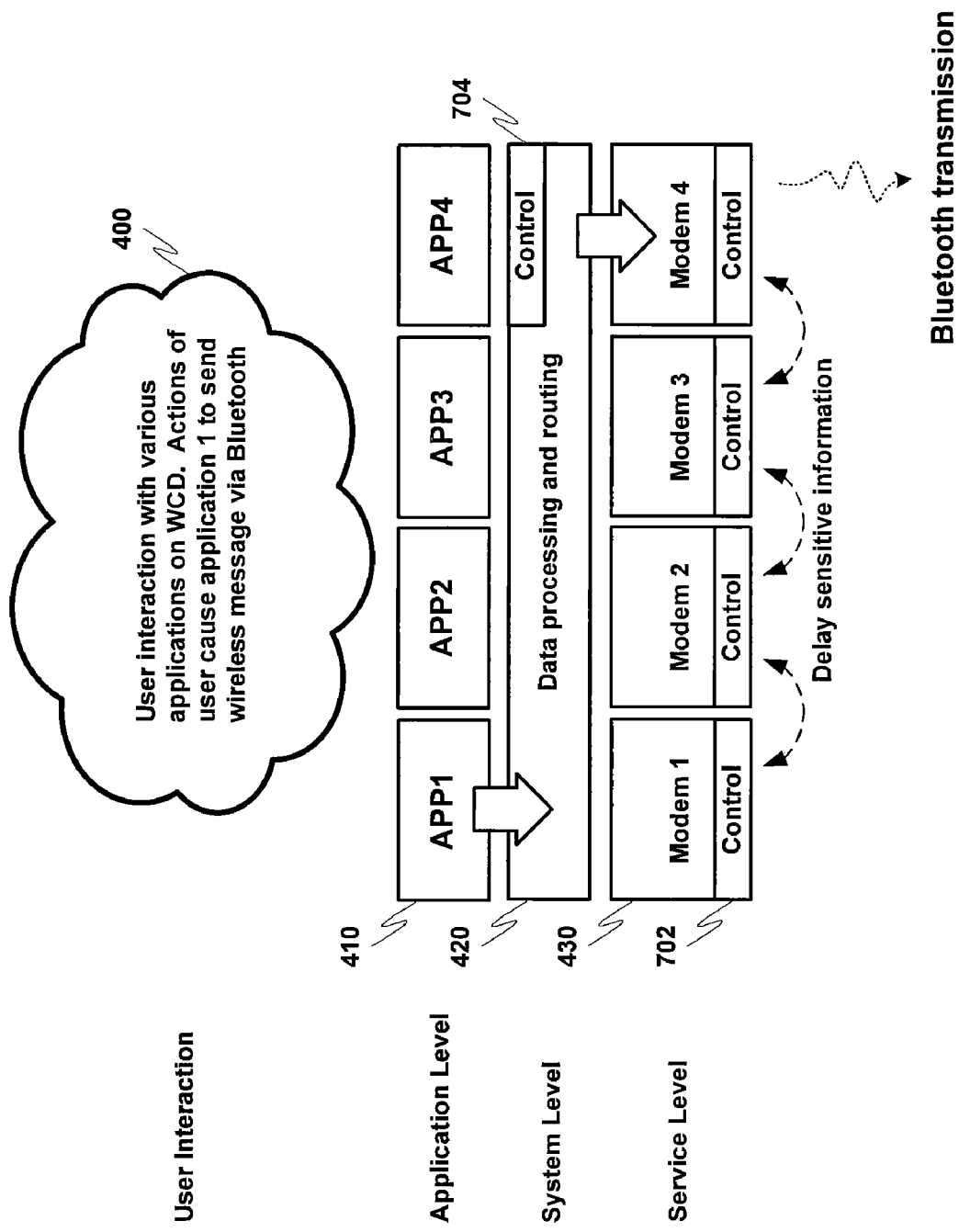
FIG. 8C discloses an exemplary operational description of a wireless communication device including a distributed multiradio control system in accordance with at least one embodiment of the present invention.

At least one effect of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information may include at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in BT (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

The radio modem activity control is based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 µs, followed by an empty slot after which is the reception slot of 577 µs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

Figure 9A:
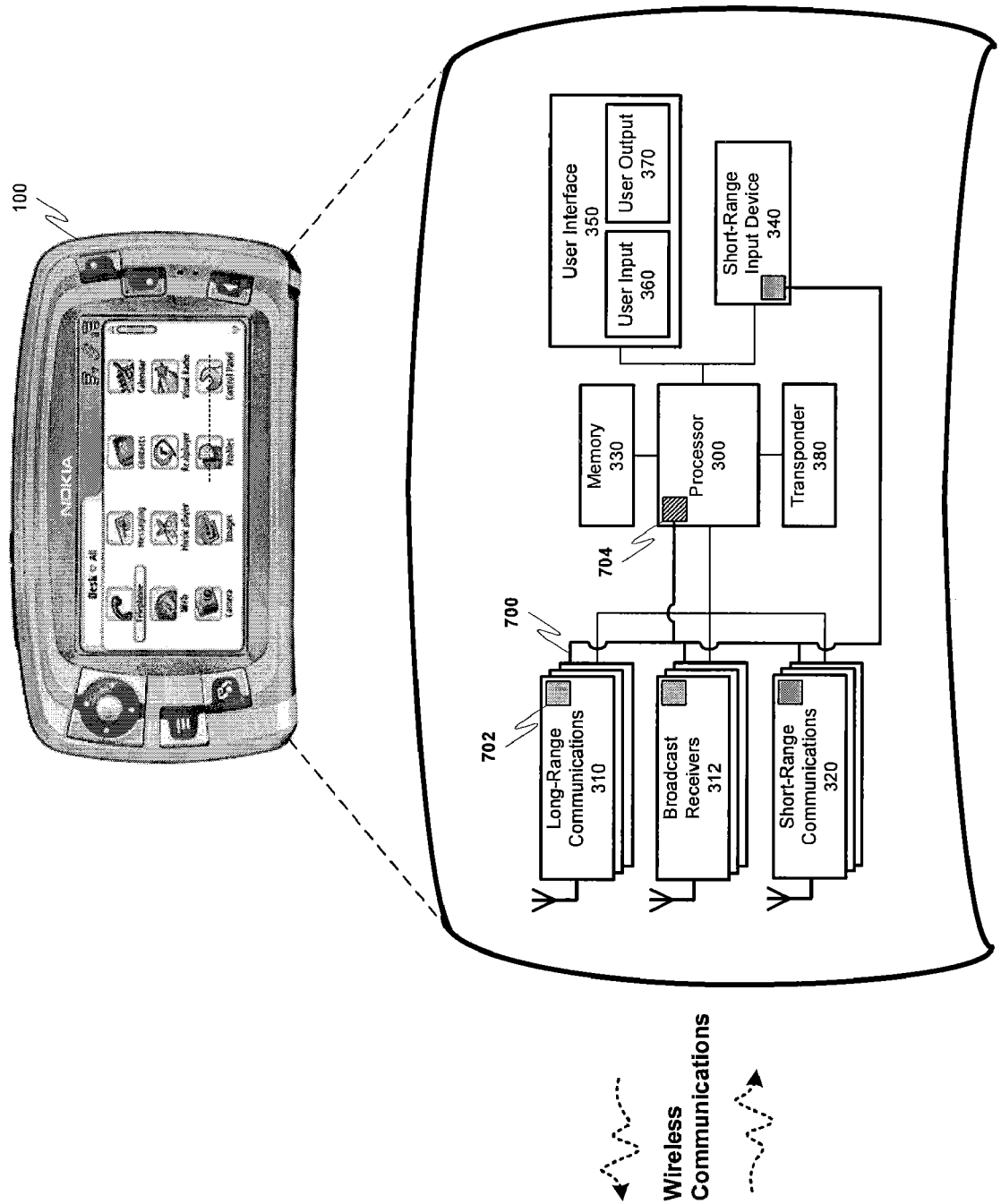
FIG. 9A discloses an exemplary structural description of a wireless communication device including a distributed multiradio control system in accordance with an alternative embodiment of the present invention.

VII. A Wireless Communication Device Including an Alternative Example of a Distributed Multiradio Control System An alternative distributed control configuration in accordance with at least one embodiment of the present invention is disclosed in FIG. 9A-9C. In FIG. 9A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communication components of WCD 100.

Referring now to FIG. 9B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

Figure 9C:
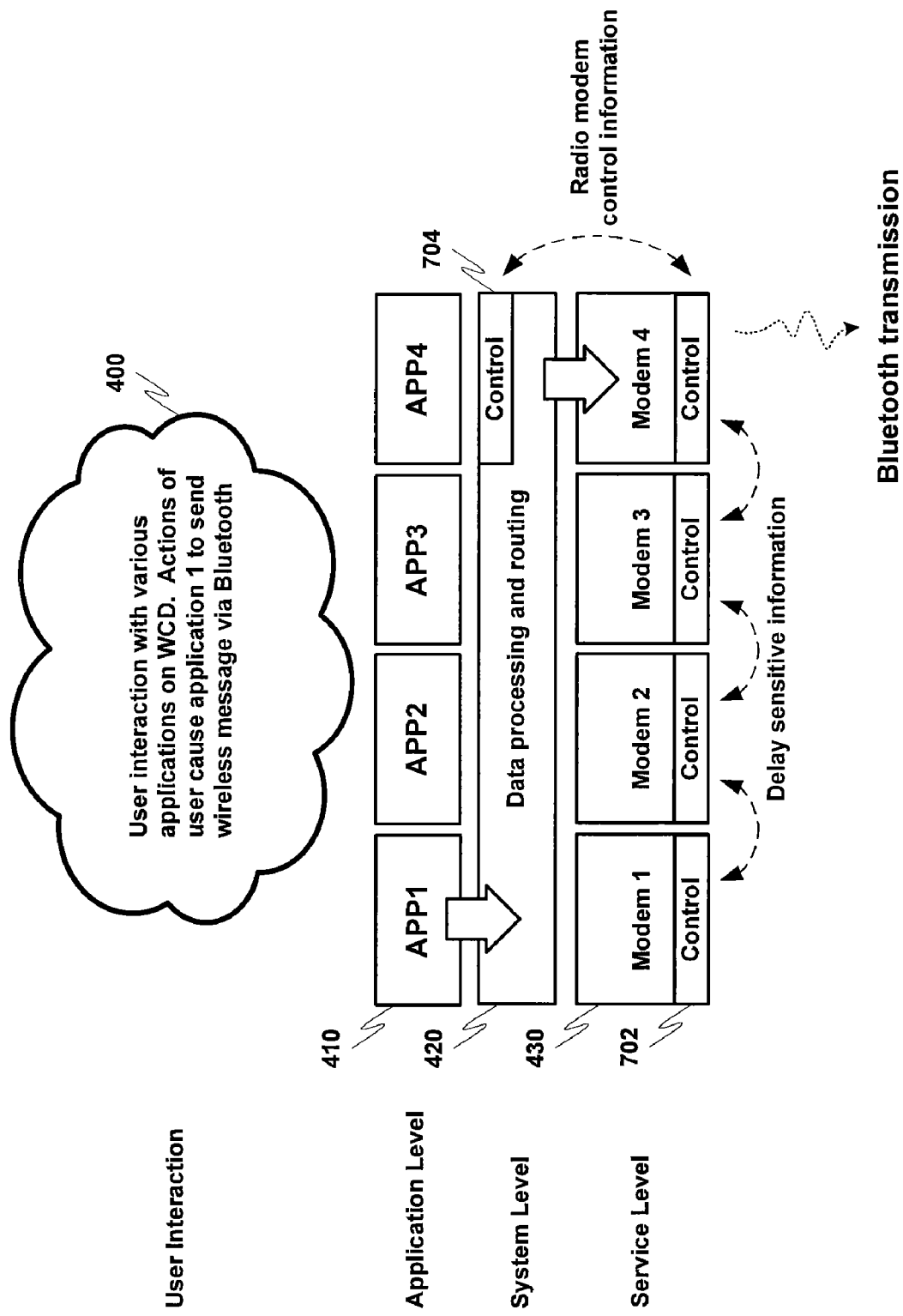
FIG. 9C discloses an exemplary operational description of a wireless communication device including a distributed multiradio control system in accordance with the alternative embodiment of the present invention disclosed in FIG. 9A.

FIG. 9C discloses the operational effect of the enhancements seen in the current alternative embodiment of the present invention on communication in WCD 100. The addition of an alternative route for radio modem control information to flow between distributed control components 702 and 704 may both improve the communication management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

An example message packet 900 is disclosed in FIG. 10 in accordance with at least one embodiment of the present invention. Example message packet 900 includes activity pattern information that may be formulated by MRC 600 or radio activity controller 720. The data payload of packet 900 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices

As a part of information acquisition services, the MCS interface 710 needs to send information to MRC 600 (or radio activity controllers 720) about periodic events of the radio modems 610. Using its MCS interface 710, the radio modem 610 may indicate a time instance of a periodic event related to its operation. In practice these instances are times from which one can calculate when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, the various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

IX. Peripheral Devices Communicating to a Dual-Mode Modem

Figure 11A:
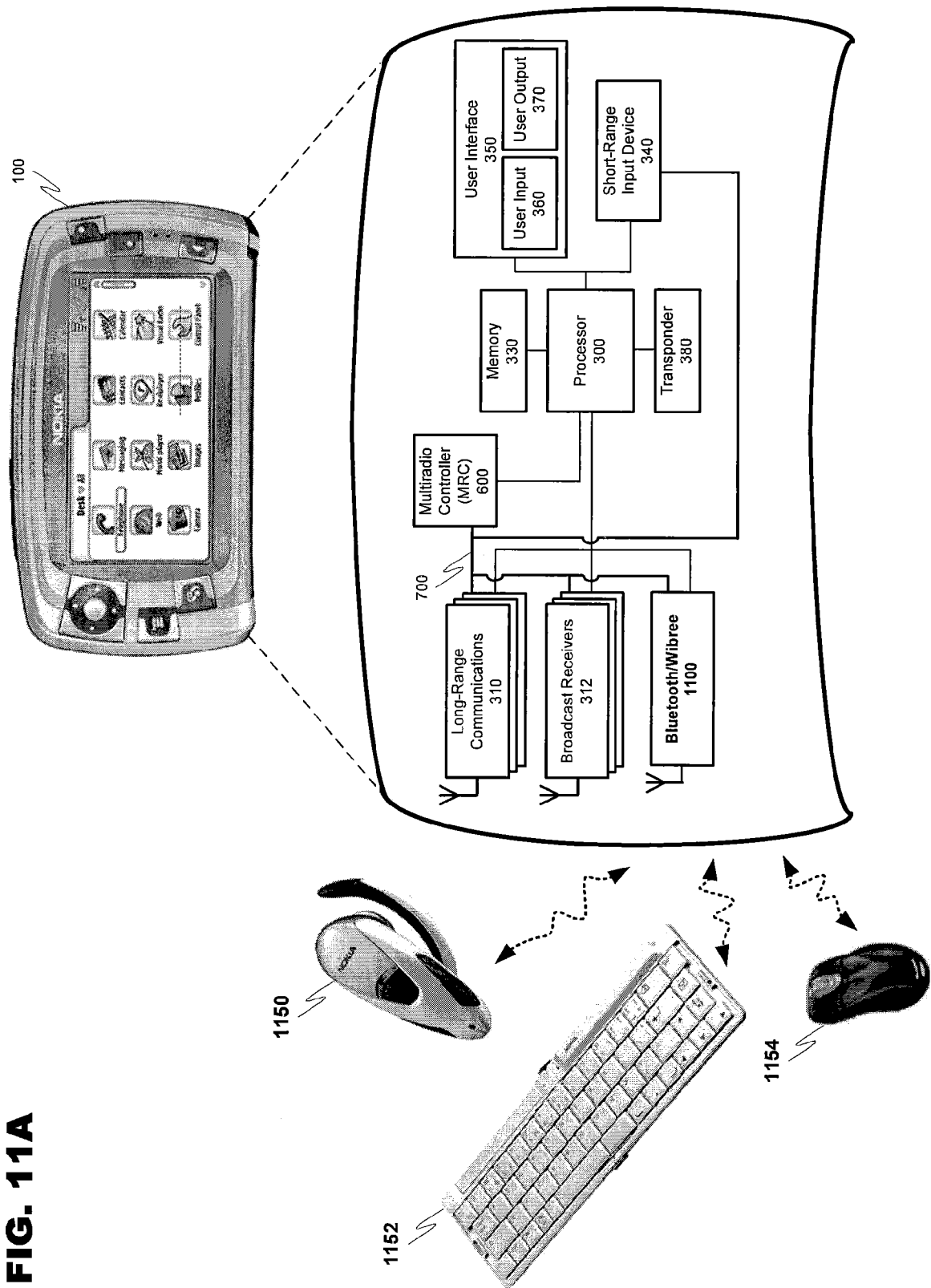
FIG. 11A discloses an example of multiple wireless peripheral devices attempting to communicate concurrently with a dual-mode radio modem in accordance with at least one embodiment of the present invention.

Referring now to FIG. 11A, an exemplary scenario is disclosed, wherein WCD 100 is in active wireless communication with peripheral devices 1150-1154. The use of the phrase "peripheral devices" is not intended to limit the present invention, and is used only to represent any device external to WCD 100 also capable of wirelessly communicating with WCD 100. Such devices may include wireless headset 1150 communicating via Bluetooth™ communication, wireless keyboard 1152 communicating via Wibree™ communication, and wireless mouse 1154 also communicating via Wibree™ communication. All of these peripheral devices may, at least in this example, communicate with a single dual-mode radio modem 1100 in WCD 100. It is foreseeable that user 110 may be conducting a telephone conversation over headset 1150 while typing on keyboard 1152 and interacting with mouse 1154 at the same time. Given a scenario wherein at least two or more peripheral devices are conducting concurrent communication with dual-mode modem 1100, the possibility of experiencing communication collisions is increased. As a result, a strategy for managing the operation of these radio protocols is needed to optimize performance while preserving quality.

Figure 11B:
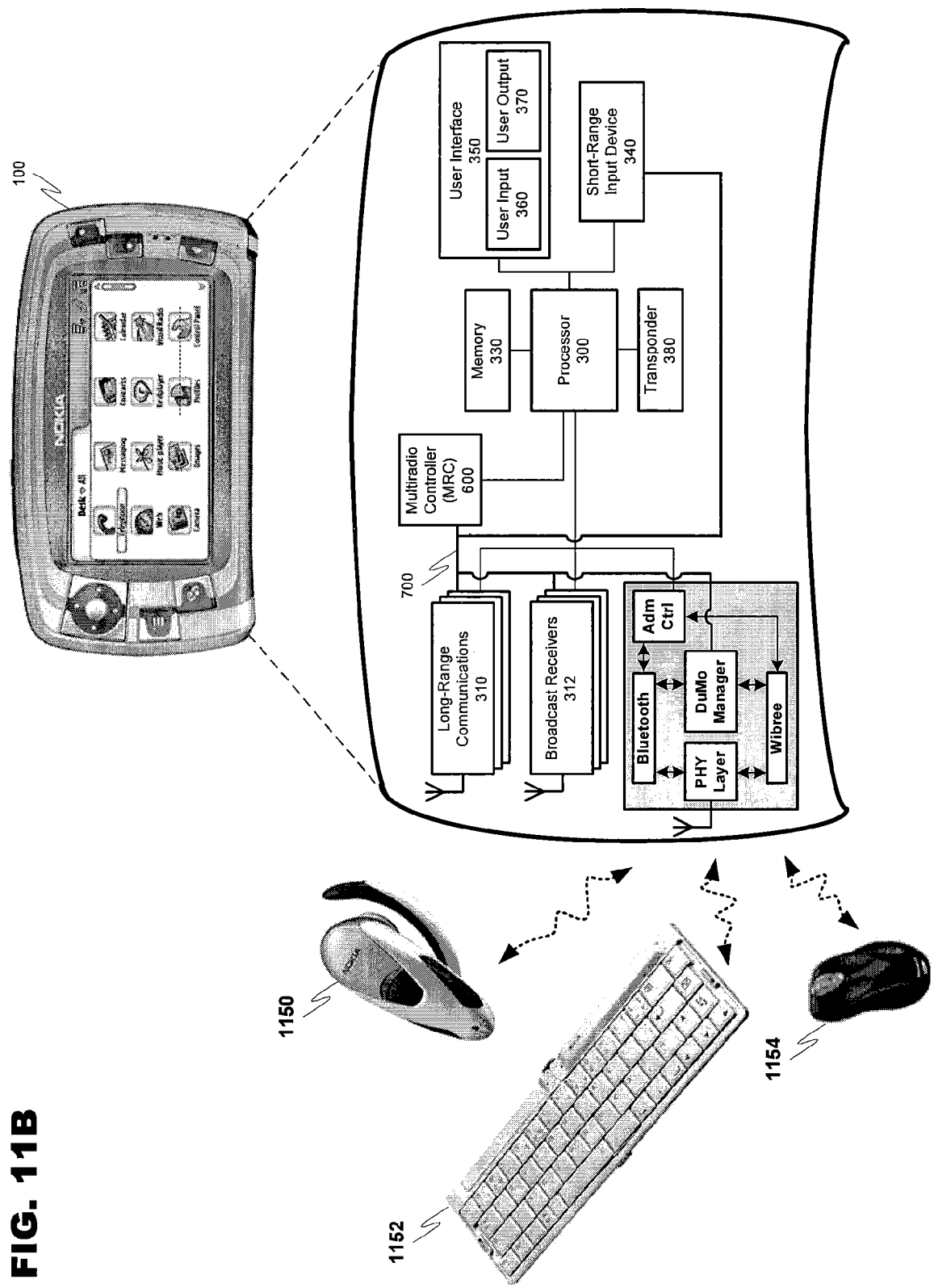
FIG. 11B discloses an example of multiple wireless peripheral devices attempting to communicate concurrently with a dual-mode radio modem including operational enhancements in accordance with at least one embodiment of the present invention.

FIG. 11B includes an exemplary implementation of at least one embodiment of the present invention. Again, in this example the three previous peripheral devices are attempting concurrent communication with WCD 100 through dual-mode radio modem 1100. However, radio modem 1100 may now include local control resources for managing both "radios" (e.g., software based radio control stacks) attempting to use the physical layer (PHY) resources of dual-mode radio modem 1100. In this example, dual-mode radio modem 1100 includes at least two radio stacks or radio protocols (labeled "Bluetooth" and "Wibree") that may share the PHY layer resources (e.g., hardware resources, antenna, etc.) of dual-mode radio modem 1100. The local control resources may include an admission controller ("Adm Ctrl") and a dual-mode controller (DuMo Manager). These local control resources may be embodied as a software program and/or in a hardware form (e.g., logic device, gate array, MCM, ASIC, etc.) in a dual-mode radio modem interface, and the radio modem interface may be coupled to, or alternatively, embedded in dual-mode radio modem 1100. The interaction of these control resources with the radio protocols utilizing dual-mode radio modem 1100 is explained below.

Figure 12A:
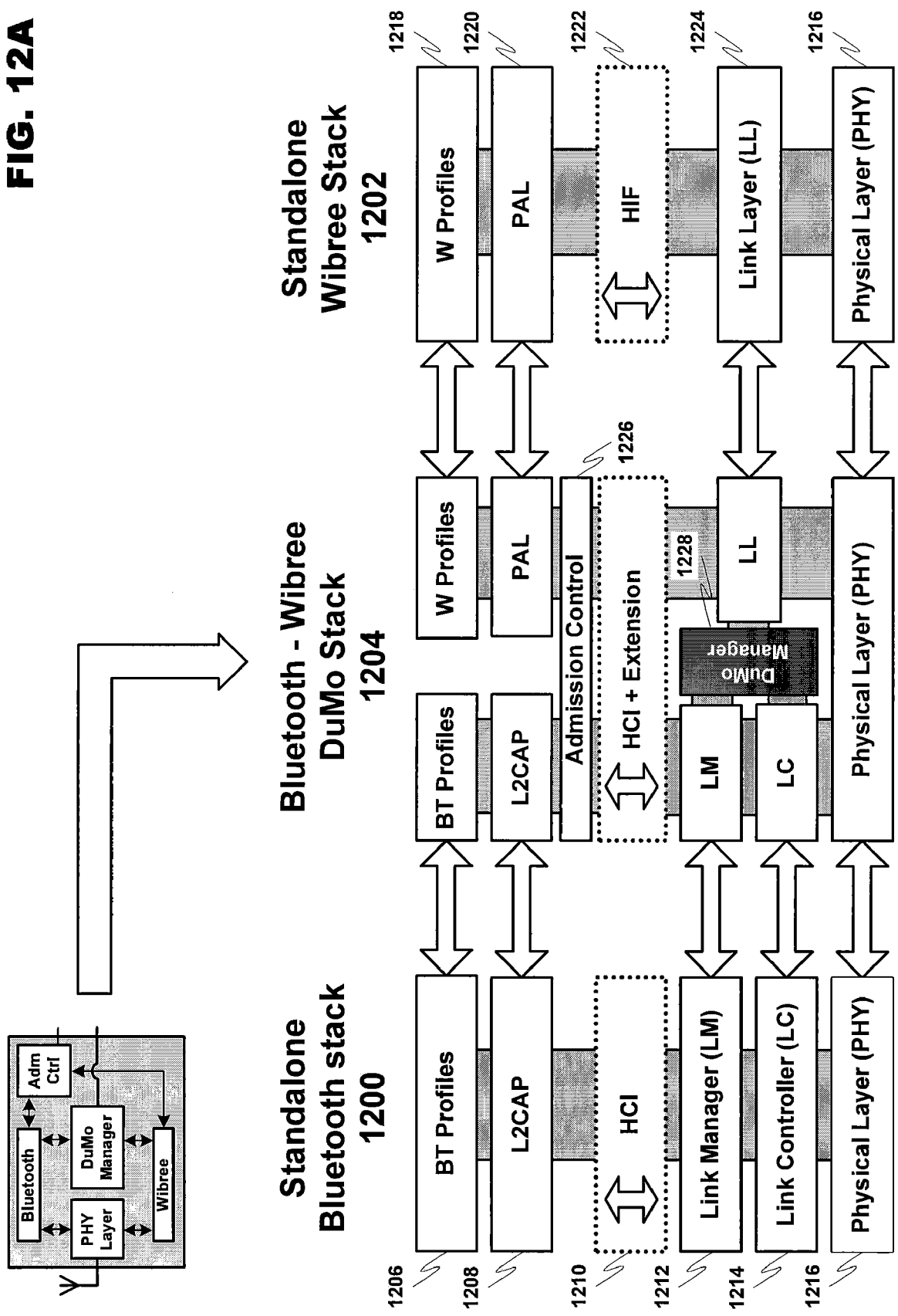
FIG. 12A discloses further detail regarding the example of FIG. 11B regarding operational enhancements for managing the operation of a dual-mode modem in accordance with at least one embodiment of the present invention.

With respect to FIG. 12A, an exemplary combination of two separate radio protocol stacks into a single combined entity controlled locally by at least an admission control 1226 and a DuMo manager 1228 is now disclosed. Initially, two example standalone stacks are shown to establish the individual elements that may be incorporated into an integrated dual-mode entity. Standalone Bluetooth™ stack 1200 includes elements that may convey information from a system level to a physical layer where it may be transmitted wireless to another device. At the top level, BT Profiles 1206 include at least a description of a known peripheral device which may be connected wirelessly to WCD 100, or an application that may utilize Bluetooth™ in order to engage in wireless communication with a peripheral device. Bluetooth™ profiles of other devices may be established through a pairing procedure wherein identification and connection information for a peripheral device may be received by WCD 100 through a polling process and then saved in order to expedite the connection to the device at a later time. After the application and/or target peripheral device (or devices) is established, any information to be sent must be prepared for transmission. L2CAP level 1208 includes at least a logical link controller and adaptation protocol. This protocol supports higher level protocol multiplexing packet segmentation and reassembly, and the conveying of quality of service information. The information prepared by L2CAP level 1208 may then be passed to an application-optional host controller interface (HCI) 1210. This layer may provide a command interface to the lower link manager protocol (LMP) layers, link manager (LM) 1212 and link controller (LC) 1214. LM 1212 may establish the link setup, authentication, link configuration and other protocols related to establishing a wireless link between two or more devices. Further, LC 1214 may manage active links between two or more devices by handling low-level baseband protocols. Wireless communication may then be established and conducted using the hardware (modem, antenna, etc.) making up physical layer (PHY) 1216. Of course, the above identified layers of Bluetooth™ stack 1200 may also be utilized in an order reversed from that disclosed above in order to receive a wireless transmission into WCD 100 from a peripheral device.

The layers in the standalone Wibree™ stack are similar to the elements previously described. However, due to the relative simplicity of Wibree™ when compared to Bluetooth™, there are actually less layers utilized to achieve wireless communication. W Profiles 1218, similar to the profiles used in Bluetooth™, are used to specify applications that may use Wibree™ for communication and peripheral devices with which a Wibree™ modem may wirelessly communicate. The profile adoption layer (PAL) 1220 may be used to prepare the information for transmission via wireless communication. HIF layer 1222 may provide an interface between the upper layers communicating with applications and schedulers in WCD 100, and the lower layers of the Wibree™ stack which establish and maintain the links to peripheral devices. Lower layers of the Wibree™ stack may further include at least link layer (LL) 1224. LL 1224 may both establish and maintain wireless communications with other wireless enabled devices through the use of Physical Layer (PHY) 1216, which is common to Bluetooth™ and Wibree™ radio protocols using dual-mode modem 1100. Wibree™ LL 1224, however, differs significantly from LM 1211 and LC 1214 in Bluetooth™, and as a result, may have a substantial effect on the functioning of DuMo manager 1228.

The central stack in FIG. 12A is an exemplary combined Bluetooth™ and Wibree™ DuMo Stack 1204 usable for managing communication in a dual-mode radio modem

1100. In this example, the elements previously described for both Bluetooth™ stack 1200 and Wibree™ stack 1202 are shown combined in a parallel structure linked by admission control 1226 and DuMo manager 1228. Admission control 1226 may act as a gateway for the dual-mode radio modem 1100 by filtering out both Bluetooth™ and Wibree™ requests from the operating system of WCD 100 that may result in conflicts. Scheduling information may also be provided by MRC 600, wherein certain periods of operation are allocated to dual-mode radio modem 1100 in view of the other active radio modems operating in WCD 100. This scheduling information may be passed down to both the HCI+Extension level of the combined protocol stacks and also to DuMo manager 1228 for further processing. However, if scheduling information from MRC 600 is critical (delay-sensitive), it may be sent through MCS 700 via a direct connection to DuMo Manager 1228. The information received by DuMo manager, and the processing involved in managing the operation of the radio protocols, is discussed below with regard to FIG. 12B.

Figure 12B:
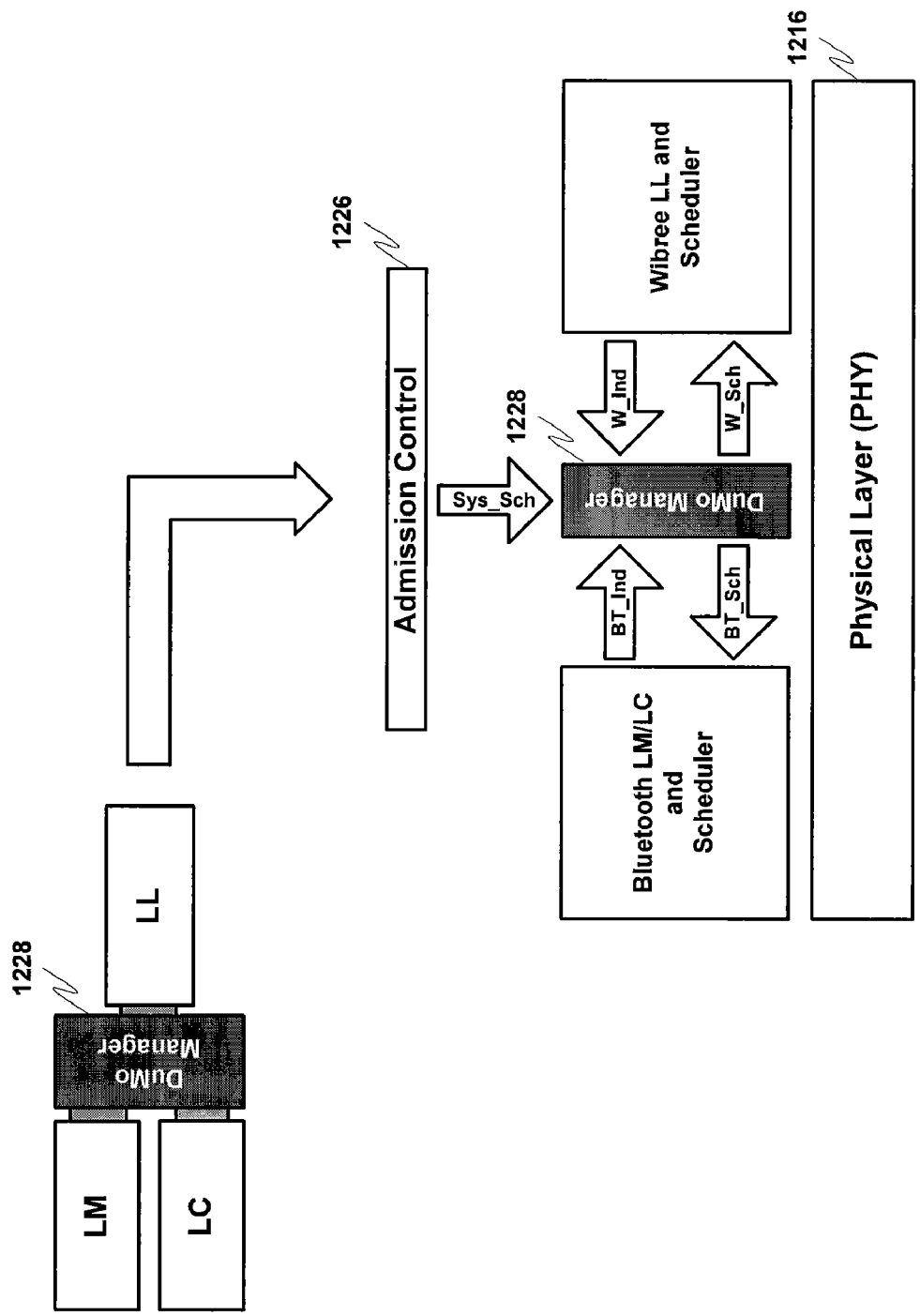
FIG. 12B discloses further detail regarding the example of FIG. 12A regarding information flow in operational enhancements for managing the operation of a dual-mode modem in accordance with at least one embodiment of the present invention.

FIG. 12B discloses in more detail an exemplary DuMo manager 1228 in accordance with at least one embodiment of the present invention. DuMo manager may receive information used in the determination of a "revised" schedule or sub-schedule for radio protocols utilizing the PHY layer 1216 of dual-mode modem 1100 (given that there may already be a schedule for the dual-mode radio modem 1100 in view of other radio modems 610 as created by MRC 600). Some information received by DuMo manager 1228 may come through upper layers, such as through admission control 1226. This information may include at least scheduling information (Sys_Sch) for the dual-mode modem 1100 as compared to other active radio modems 610 in WCD 100 (per MRC 600). As previously stated above, the urgency involved with delay-sensitive information, including some scheduling information, may require it to be delivered from MRC 600 directly to DuMo manager 1228 via MCS 700. Other information may include indication information from the Bluetooth™ radio stack (BT_Ind) and indication information from the Wibree™ radio stack (W_Ind) of the current state of each radio protocol. Indication information may include the current state of the modem with regard to each radio protocol (e.g., whether the dual-mode radio modem 1100 is actively receiving information or transmitting information from a certain protocol), whether there is information queued to send for either protocol, the urgency of the information to send for each protocol, etc. This indication information is used by DuMo manager 1228 to determine scheduling (e.g., BT_Sch and W_Sch) for the individual radios of the dual-mode modem so that dual-mode radio modem 1100 may share time between various protocols without experiencing communication errors. In making these scheduling decisions, DuMo manager 1228 must operate in accordance with the orders, parameters and/or instructions given by admission control 1226.

X. Scheduling Strategy

FIG. 13 discloses exemplary timing and scheduling diagrams for at least two radio protocols usable in accordance with at least one embodiment of the present invention. An example of radio protocols that may reserve time in the manner disclosed in FIG. 13 are Bluetooth™ and Wibree™ (as previously discussed), however, the present invention is not limited exclusively to any particular wireless communication medium. The example shows blocks of time reserved for transmitting (TX) and receiving (RX) one or more packets between a master device and three slave devices. In the case of Bluetooth™ and Wibree™, communication packets may include at least three parts: an access code, a header and payload. These packets may be organized into at least two classifications based on functionality. In Bluetooth™, Asynchronous Connectionless Link (ACL) transactions may create an asynchronous (packet-switched) connection between two devices created on the LMP level. ACL packets transmitted to establish a connection may be, for example, polling packets, which may contain only an access code and a header. When a slave device receives a poll packet, it must acknowledge receipt to the master by answering immediately with a similar abbreviated transmission to the master device. After a link is established between master and slave through ACL communication, Synchronous Connection Oriented (SCO) communication may occur. A SCO link is a circuit-switched connection for reserved bandwidth communications (e.g., voice information). SCO packets do not include a cyclic redundancy check (CRC) and are never retransmitted. SCO links may only be established after an ACL link has already established the initial connection between devices.

In the example disclosed in FIG. 13, the Bluetooth™ master may initiate ACL communication through the sending of a polling packet to a slave. This initial information exchange may occur on a periodic basis, and may operate in what is commonly called a "sniff" mode since any ACL communication is coordinated so that the slave device knows when to "sniff" for any new transmission from a master device. Operating using a coordinated sniff mode may result in a power savings in both the devices since the master and slave will only be actively transmitting and/or receiving during a planned period when communication may occur. It is important to note that a Bluetooth™ master may communicate to one or more slaves simultaneously. As a result, a slave must receive and interpret the entire polling packet in order to determine if the information being advertised is directed to the particular slave. If this information does pertain to slave, it will respond to the master. The ACL phase of the exchange may be completed when the master receives a response from the slave acknowledging that it is ready to receive the advertised SCO information. As further shown in FIG. 13, a SCO link may then commence with the master and slave exchanging information. This transaction may continue until the next instance of the sniff period. In the disclosed example, the master device has no additional information to send to the client during the next sniff period. Since the slave does not know the full extent of any information to be transmitted from the master device, the slave maintains preparedness in a reception mode until the next sniff period, wherein more information is now ready to be sent from the master to the slave device.

In at least one example of the present invention, a transaction initiated with the BT Slave (headset 1150) is established by ACL communication which is followed by a SCO transaction. Bluetooth™ communication is the radio protocol having the highest priority in this example. This priority is defined further by the legend at the bottom of the figure, which discloses that white packets are for the high priority protocol, shaded packets indicate communication to a lower priority protocol, and that packets with a broken outline are optional transmissions (e.g., there may be additional information to transmit if there is more data in the queue to be transacted and if time permits). During the next sniff period no additional information is scheduled to be transacted between WCD 100 and headset 1150. In accordance with at least one embodiment of the present invention, DuMo 1228 may utilize this time for communication over Wibree™ to one or both of the W Slaves (e.g., mouse 1152 and keyboard 1154). Time is shown being allocated first to mouse 1152, wherein an ACL transaction occurs followed by mouse 1152 sending SCO information to dual-mode radio modem 1100. Unused time is also diverted to keyboard 1154, allowing some information to be exchanged before the start of the next Bluetooth™ sniff period. After the second set of ACL and SCO transactions for headset 1150, more unused communication time may be diverted for the Wibree™ devices. In this case, there is no response from either mouse 1152 or keyboard 1154 to the poll from WCD 100. It is up to the admission control 1226 of dual-mode radio modem 1100 to determine connection and radio parameters for both Bluetooth™ and Wibree™ so that they may be scheduled by DuMo manager 1228. As an example, admission control 1226 may be required to determine a possible advertisement interval and sniff interval of a Wibree™ radio protocol so that the Wibree™ radio protocol may operate in-between active Bluetooth™ slots.

Figure 14:
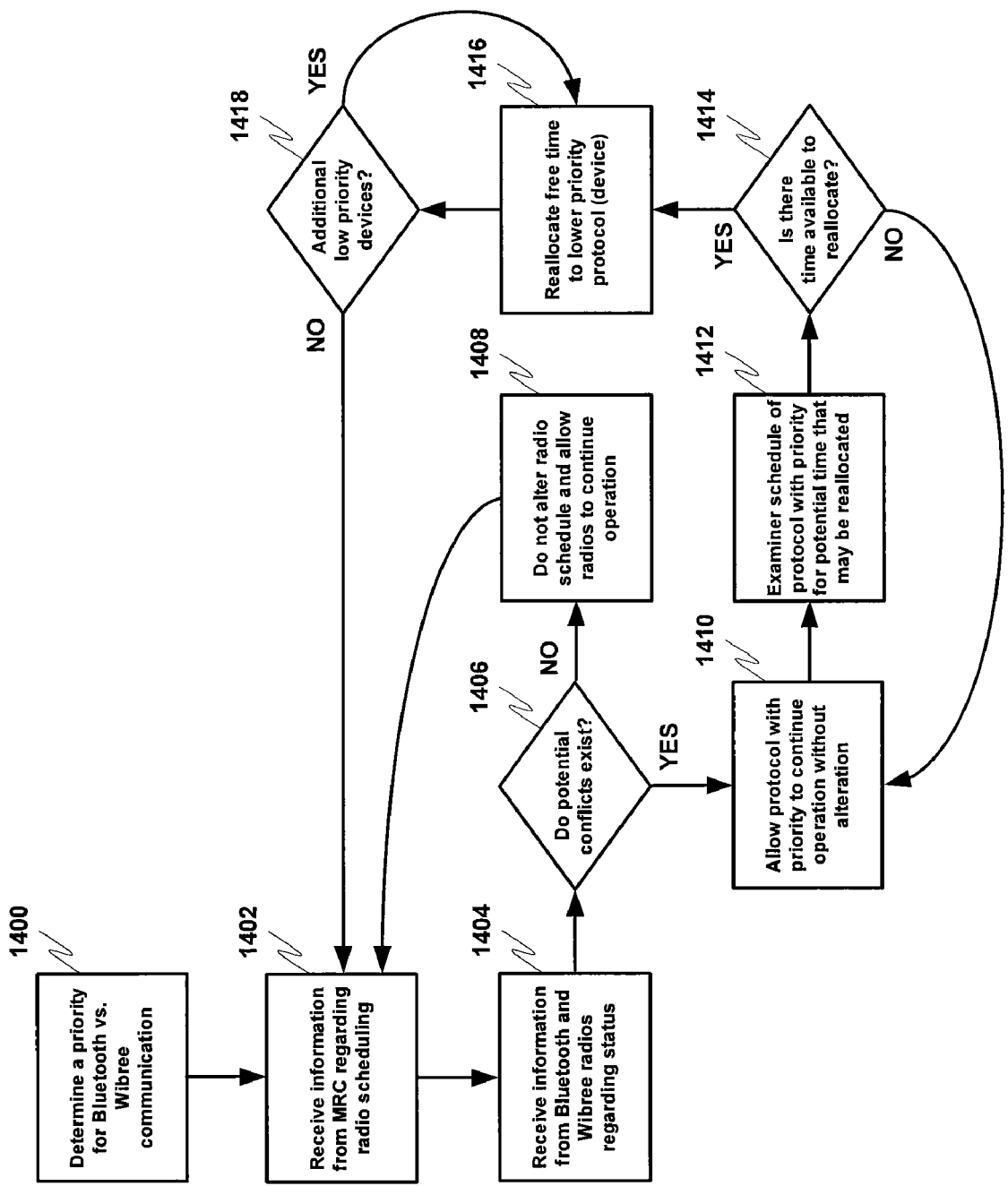
FIG. 14 discloses a flowchart for an exemplary process by which the present invention may operate a dual-mode radio modem utilizing at least two radio protocols communicating concurrently in accordance with at least one embodiment of the present invention.

A flow chart showing an exemplary process for managing operations in a dual-mode radio modem 1100 when at least two radio protocols are being utilized is shown in FIG. 14. In step 1400 a priority is determined between Bluetooth™ and Wibree™ communication. The priority may be set in a variety of ways. For example, priority may be set at the application level by an application utilizing a certain radio protocol (e.g., a certain transaction, like the sending of a credit card number, may be deemed high priority). Further, the priority may be set at the system level by a user-set configuration or by a controller, such as MRC 610, based on the message traffic assigned to a particular radio protocol or the ability of a radio protocol to operate without conflicting with other active wireless mediums. The priority may also be set at the dual-mode radio modem 1100 level. Typically it is up to admission control 1226 to set the priorities within the dual-mode modem as per the application and user requirements. Admission control 1226 and/or DuMo manager 1228 may monitor the message buffer for the radio protocols and may reprioritize a radio protocol if the number of pending messages exceeds a predetermined limit, or if the messages queued for a particular protocol exceed an age limit (e.g., messages have been waiting to be sent for too long).

In step 1402, DuMo manager 1228 may receive information from MRC regarding scheduling for the dual-mode radio modem 1100. This information may be combined with information received from the Bluetooth™ and Wibree™ radio stacks in step 1404 and may be used to determine how to allocate the time between radio protocols. In step 1406 a determination may be made as to whether potential communication conflicts exist in the communications as scheduled. If no potential communication errors exist, then in step 1408 the radio protocols may be allowed to communicate as scheduled by the system (e.g., by MRC 600) and the cycle may begin again with more information being supplied to admission control 1226 and/or DuMo manager 1228. If potential communication conflicts do exist, then in step 1410 the protocol that is considered highest priority may be allowed to continue operation without alteration by local control resources in dual-mode radio modem 1100. However, DuMo manager 1228 may also examine the communication schedule of the highest priority protocol in order to determine whether potential unused time may be reallocated (step 1412). In such instances, the time may be previously reserved for the high priority protocol, but in actuality, there will be no active communication occurring during this period. The analysis searching for unused time will continue in step 1414 until any "free" time is found. The unused time may be allocated to devices that are communicating using a lower priority radio protocol in steps 1416 and 1418. The process may then resume from step 1402 when new scheduling information may be sent to admission control 1226 and/or DuMo manager 1228 from the system level (e.g., from MRC 600 via MCS 700).

The present invention is an improvement over existing systems in at least one benefit that may be realized in operational management that may be provided for a dual-mode radio modem. This operational management may allow one radio modem to concurrently communicate over at least two radio protocols while preserving both performance and quality. As a result, a small number of physical radio modems may be employed to simultaneously communicate over a larger number of radio protocols in a wireless communication device.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed:

1. An apparatus, comprising:
   a control entity; and
   a radio modem including physical layer resources configured to support at least two radio protocols, the radio modem further including a radio modem interface and a local controller, the local controller being configured to:
   receive operational information from the control entity via the radio modem interface for at least one of the at least two radio protocols that share access to the physical layer resources, the operational information comprising one or more parameters for controlling operation of the at least one of the at least two radio protocols and schedule information including at least one time period during which the radio modem is allowed to communicate;
   receive status information directly from the at least two radio protocols;
   determine priorities for the at least two radio protocols for accessing the physical layer resources during the at least one time period based on the operational information and the status information corresponding to the at least two radio protocols; and
   schedule access to the physical layer resources during the at least one time period for the at least two radio protocols based on the determined priorities, the scheduling comprising reallocating a portion of the at least one time period that is reserved in received schedule information for a higher priority radio protocol to access the physical layer resources that the local controller determines will go unused to at least one lower priority radio protocol.

2. The apparatus of claim 1, wherein the apparatus is a wireless communication device including a plurality of radio modems, each radio modem further including a radio modem interface.

3. The apparatus of claim 1, wherein the local controller is a Dual Mode (DuMo) manager that is integrated into the radio modem interface, the DuMo manager being configured to coordinate the operation of the at least two protocols.

4. The apparatus of claim 3, wherein the local controller further includes an Admission control configured to assign at least radio and connection parameters so that the DuMo manager can coordinate operation for avoiding collisions between the at least two radio protocols.

5. A method, comprising:
receiving operational information from a control entity via a radio modem interface for at least one of at least two radio protocols that share access to physical layer resources in a radio modem, the operational information comprising one or more parameters for controlling operation of the at least one of the at least two radio protocols and schedule information including at least one time period during which the radio modem is allowed to communicate;
receiving status information directly from the least two radio protocols; and
determining priorities for the at least two radio protocols based on the operational information and the status information corresponding to the at least two radio protocols; and
scheduling access to the physical layer resource during the at least one time period for the at least two radio protocols based on the determined priorities, the scheduling comprising reallocating a portion of the at least one time period that is reserved in received schedule information for a higher priority radio protocol to access the physical layer resources that the local controller determines will go unused to at least one lower priority radio protocol.

6. The method of claim 5, wherein the control entity is a multiradio controller in a wireless communication device that also includes the radio modem.

7. The method of claim 6, wherein the operational information is based on scheduling for all radio modems in the wireless communication device.

8. The method of claim 5, wherein the status information corresponding to the at least two radio protocols is received from radio protocol stacks corresponding to each of the at least two radio protocols.

9. The method of claim 8, wherein the status information corresponding to the at least two radio protocols includes information related to at least one of the current status of the dual mode-radio modem, a current message queue for each radio protocol stack and a priority level for the messages pending for each radio protocol stack.

10. The method of claim 5, wherein the status information further includes a priority determination for the at least two radio protocols, wherein the determination of a higher priority radio protocol and a lower priority radio protocol includes obtaining radio protocol priority information from at least one of an application level of the wireless communication device, an operating system level of the wireless communication device, a user-specified configuration in the wireless communication device and the dual-mode radio modem.

11. A computer program product comprising computer executable program code recorded on a non-transitory computer readable storage medium, the computer executable program code comprising:
code configured to receive operational information from a control entity via a radio modem interface for at least one of at least two radio protocols that share access to physical layer resources in a radio modem, the operational information comprising one or more parameters for controlling the at least one of the least two radio protocols and schedule information including at least one time period during which the radio modem is allowed to communicate;
code configured to receive status information directly from the least two radio protocols;
code configured to determine priorities for the at least two radio protocols based on the operational information and the status information; and
code configured to schedule access to the physical layer resource during the at least one time period for the at least two radio protocols based on the determined priorities, the scheduling comprising reallocating a portion of the at least one time period that is reserved in received schedule information for a higher priority radio protocol to access the physical layer resources that the local controller determines will go unused to at least one lower priority radio protocol.

12. The computer program product of claim 11, wherein the control entity is a multiradio controller in a wireless communication device that also includes the radio modem.

13. The computer program product of claim 12, wherein the operational information is based on scheduling for all radio modems in the wireless communication device.

14. The computer program product of claim 11, wherein the status information corresponding to the at least two radio protocols is received from radio protocol stacks corresponding to each of the at least two radio protocols.

15. The computer program product of claim 14, wherein the status information corresponding to the at least two radio protocols includes information related to at least one of the current status of the dual mode-radio modem, a current message queue for each radio protocol stack and a priority level for the messages pending for each radio protocol stack.

16. The computer program product of claim 11, wherein the status information further includes a priority determination for the at least two radio protocols, wherein the determination of a higher priority radio protocol and a lower priority radio protocol includes obtaining radio protocol priority information from at least one of an application level of the wireless communication device, an operating system level of the wireless communication device, a user-specified configuration in the wireless communication device and the dual-mode radio modem.

17. A radio modem controller, comprising:
a radio modem controller coupled to a radio modem interface, the radio modem interface being part of a radio modem configured to:
receive operational information from a control entity via the radio modem interface for at least one of at least two radio protocols that share access to physical layer resources in a radio modem in the same apparatus as the control entity, the operational information comprising one or more parameters for controlling the at least one of the at least two radio protocols and schedule information including at least one time period during which the radio modem is allowed to communicate;
receive status information directly from the least two radio protocols;
determine priorities for the at least two radio protocols based on the operational information and the status information; and
schedule access to the physical layer resource during the at least one time period for the at least two radio protocols based on the determined priorities, the scheduling comprising reallocating a portion of the at least one time period that is reserved in received schedule information for a higher priority radio protocol to access the physical layer resources that the local controller determines will go unused to at least one lower priority radio protocol.

18. The controller of claim 17, wherein the radio modem controller is integrated into the radio modem interface.

19. A radio modem, comprising:

means for receiving operational information from a control entity in the same apparatus as the radio modem, the operational information being received via a radio modem interface in a controller for at least one of at least two radio protocols that share access to physical layer resources in the radio modem, the operational information comprising one or more parameters for controlling the at least one of the at least two radio protocols and schedule information including at least one time period during which the radio modem is allowed to communicate;

means for receiving status information in the controller directly from the least two radio protocols;

means for determining priorities for the at least two radio protocols based on the operational information and the status information; and means for scheduling access to the physical layer resource during the at least one time period for the at least two radio protocols based on the determined priorities, the scheduling comprising reallocating a portion of the at least one time period that is reserved in received schedule information for a higher priority radio protocol to access the physical layer resources that the local controller determines will go unused to at least one lower priority radio protocol.

20. A chipset, comprising:

a radio modem controller, the radio modem interface being part of a radio modem configured to:
  receive operational information from a control entity via the radio modem interface for at least one of at least two radio protocols that share access to physical layer resources in a radio modem in the same apparatus as the control entity, the operational information comprising one or more parameters for controlling the at least one of the at least two radio protocols and schedule information including at least one time period during which the radio modem is allowed to communicate;
  receive status information directly from the least two radio protocols;
  determine priorities for the at least two radio protocols based on the operational information and the status information; and
    schedule access to the physical layer resource during the at least one time period for the at least two radio protocols based on the determined priorities, the scheduling comprising reallocating a portion of the at least one time period that is reserved in received schedule information for a higher priority radio protocol to access the physical layer resources that the local controller determines will go unused to at least one lower priority radio protocol.

* * * * *